United States Patent [19]

Ludwig et al.

[11] Patent Number: 5,555,381
[45] Date of Patent: *Sep. 10, 1996

[54] MICROCOMPUTER ARCHITECTURE UTILIZING AN ASYNCHRONOUS BUS BETWEEN MICROPROCESSOR AND INDUSTRY STANDARD SYNCHRONOUS BUS

[75] Inventors: Thomas E. Ludwig, Irvine; Thomas W. Craft, Mission Viejo, both of Calif.

[73] Assignee: AST Research, Inc., Irvine, Calif.

[*] Notice: The term of this patent shall not extend beyond the expiration date of Pat. No. 5,191,657.

[21] Appl. No.: 451,517

[22] Filed: May 26, 1995

Related U.S. Application Data

[63] Continuation of Ser. No. 346,352, Nov. 29, 1994, abandoned, which is a continuation of Ser. No. 220,942, Mar. 31, 1994, abandoned, which is a continuation of Ser. No. 972,515, Nov. 6, 1992, abandoned, which is a continuation of Ser. No. 433,982, Nov. 9, 1989, Pat. No. 5,191,657.

[51] Int. Cl.$^6$ ............................. G06F 13/00; G06F 13/42
[52] U.S. Cl. .......................... 395/281; 395/285; 395/308; 395/500; 364/DIG. 1; 364/228.6; 364/231; 364/232.7; 364/235; 364/238.3; 364/238.4; 364/238.5; 364/239.9; 364/240; 364/240.2; 364/240.8; 364/240.9; 364/241.9; 364/242.3; 364/262.4
[58] Field of Search ................................ 395/306, 309, 395/308, 281, 285, 500

[56] References Cited

U.S. PATENT DOCUMENTS

| | | | |
|---|---|---|---|
| 4,205,373 | 5/1980 | Shah et al. ............................. | 395/425 |
| 4,236,203 | 11/1980 | Curley et al. .......................... | 395/325 |

(List continued on next page.)

OTHER PUBLICATIONS

Gabel "Upgrading an old computer", PC Week, Jan. 19, 1988, v5n3 p. 517(3)—FullText copy 5 pages.
The Definicon 68020 Coprocessor, Byte, Jul. 1986, pp. 120–144.
The Conquest Turbo PC, Byte, Jul. 1986, pp. 289–291.
IBM PC Accelerators, Byte, 1986 Extra Edition.
Advance Information Sheet, IBM® PS/2™ Model 50/60 Compatible ChipSet™, Chips and Technologies, Inc., Copyright©, 1985, 1986, 1987.
Preliminary Specification, AT/386 CHIPSet™, Chips and Technologies, Inc., Copyright ©1985, 1986, 1987.
Product Specification, PC/AT Compatible CHIPSet™, Chips and Technologies, Inc., Feb., 1986.
Preliminary Specification, Advanced Memory Controller for PC/AT Compatible CHIPSet™, Chips and Technologies, Inc., Copyright ©1987.

(List continued on next page.)

*Primary Examiner*—Thomas C. Lee
*Assistant Examiner*—D. Dinh
*Attorney, Agent, or Firm*—Knobbe, Martens, Olson & Bear

[57] ABSTRACT

A computer system includes a microprocessor that is electrically connected to a first synchronous bus operating in synchronism with a first clock signal at a first clock frequency. A second synchronous bus operates in synchronism with a second clock signal at a second clock frequency and provides electrical communication to a number of peripheral devices. An asynchronous bus provides data communication between the first and second synchronous bus using handshaking signals so that the first and second clock signals operate independently of each other. The operating frequency and other parameters of the microprocessor and the first synchronous bus can be changed without requiring any changes to the second synchronous bus so that the microprocessor and the first synchronous bus can take advantage of advances in technology while allowing the second synchronous bus and the associated peripheral devices to remain compatible with previous versions of the computer system.

2 Claims, 14 Drawing Sheets

U.S. PATENT DOCUMENTS

| | | | |
|---|---|---|---|
| 4,245,301 | 1/1981 | Rokutanda et al. | 395/325 |
| 4,263,648 | 4/1981 | Stafford et al. | 395/550 |
| 4,287,560 | 9/1981 | Forbes et al. | 395/375 |
| 4,293,908 | 10/1981 | Bradley et al. | 395/275 |
| 4,315,308 | 2/1982 | Jackson | 395/325 |
| 4,317,169 | 2/1982 | Panepinto, Jr. et al. | 395/425 |
| 4,396,995 | 8/1983 | Grau | 395/575 |
| 4,528,626 | 7/1985 | Dean et al. | 395/275 |
| 4,558,412 | 12/1985 | Inoshita et al. | 395/325 |
| 4,604,683 | 8/1986 | Russ et al. | 395/325 |
| 4,635,192 | 1/1987 | Ceccon et al. | 395/325 |
| 4,688,166 | 8/1987 | Schneider | 395/275 |
| 4,695,948 | 9/1987 | Blevins et al. | 395/325 |
| 4,703,420 | 10/1987 | Irwin | 395/800 |
| 4,750,111 | 6/1988 | Crosby, Jr. et al. | 395/550 |
| 4,947,366 | 8/1990 | Johnson | 395/275 |
| 4,979,097 | 12/1990 | Triolo et al. | 395/325 |
| 5,079,696 | 1/1992 | Priem et al. | 395/500 |
| 5,113,523 | 5/1992 | Colley et al. | 395/800 |
| 5,191,657 | 3/1993 | Ludwig et al. | 395/325 |

OTHER PUBLICATIONS

Advance Information Sheet, IBM® PS/2™Model 80 Compatible CHIPSet™, Chips and Technologies, Inc., Copyright ©1985, 1986, 1987.

Preliminary Specification, New Enhanced At (Neat™) Data Book (IPC) CHIPSet™, Chips and Technologies, Inc., Copyright ©1985, 1986, 1987.

Advertisement, Personal Computer Support Group, Breakthru 286, Byte, Jan. 1987.

AST's Premium 286, Byte, Jan. 1987.

Card Converts PC to AT, Byte, Jan. 1987.

80386 Boards for PC XT and AT, Byte, Jan. 1987.

PC/AT Compatible Systems: . . . , Chips and Technologies, Inc., Sep., 1987.

Accelerator Board for 80386 Performance, Byte, Jan. 1988.

Cableless 386 Upgrade, Byte, Jan. 1988.

Ciro Cornejo, et al., "Comparing IBM's Micro Channel and Apple's NuBus," *Byte*, Extra Edition, 1987, pp. 83–91.

FIG. 7 NON-MICROPROCESSOR CYCLE TO P-BUS DEVICE

FIG. 8 NON-MICROPROCESSOR CYCLE TO ISA-BUS DEVICE

FIG. 9 READ CYCLE TO P-BUS DEVICE

FIG. 10 WRITE CYCLE TO P-BUS DEVICE

MOTHERBOARD P-BUS INTERFACE CONTROLLER
STATE TRANSITION DIAGRAM

MICROCOMPUTER ARCHITECTURE UTILIZING AN ASYNCHRONOUS BUS BETWEEN MICROPROCESSOR AND INDUSTRY STANDARD SYNCHRONOUS BUS

This application is a continuation of U.S. patent application Ser. No. 08/346,352, filed Nov. 29, 1994 now abandoned, which was a continuation of U.S. patent application Ser. No. 08/220,942, filed Mar. 31, 1994 (now abandoned), which was a continuation of U.S. patent application Ser. No. 07/972,515, filed Nov. 6, 1992 (now abandoned), which was a continuation of U.S. patent application Ser. No. 07/433,982, filed Nov. 9, 1989 (now U.S. Pat. No. 5,191,657), by the same inventors.

BACKGROUND OF THE INVENTION

1. Field of the Invention

The present invention generally relates to microcomputer architectures and, more particularly, is concerned with the use of an asynchronous bus to provide communication between a microprocessor and an independent industry standard synchronous bus.

2. Description of the Prior Art

There are many classifications for computers, ranging from inexpensive microcomputers used in homes and offices, to liquid-cooled supercomputers used in universities and research laboratories. The present invention relates to microcomputers, also known as "personal computers" (or "PCs").

A microcomputer can be defined as a "computer having a mass-produced integrated circuit microprocessor", such as, for example, the Intel 80×86 family of products which presently includes the 8086, 80286, 80386 and 80486 microprocessors. Although the microprocessor is the heart and defining feature of a microcomputer, it is not very useful unless it is integrated with a memory and a set of input/output ("I/O") devices, also known as peripherals. These three classes of devices communicate among themselves over a shared set of digital signal lines called a bus.

The bus is logically organized into sets of address, data, and control lines. The address lines are for communicating device addresses which uniquely identify a particular device on the bus. The data lines are for communicating binary data between two bus devices, a bus master, which initiates a data transfer by placing an address on the address lines, and a bus slave, which reads and decodes the address generated by the bus master as its own. The control lines are for coordinating access to the bus and selecting a mode of operation on the bus such as write data or read data modes.

For example, if the bus master is a microprocessor and the bus slave is a memory, the microprocessor may direct the memory to be read by placing the proper logic level on a write/read control line. In this way, the microprocessor gains access to the data stored in the memory location specified by the logic levels placed on the address lines by the microprocessor.

A bus cycle begins when the bus master directs a write or a read on the bus. The bus cycle is completed after all data has been transferred across the bus and the bus master releases control of the bus. If the two devices communicating with each other over the bus operate at the same speed, then a bus cycle may be achieved over a minimum number of clock cycles. If, on the other hand, a bus device can only transmit or receive data over many clock cycles, then a delay must be injected into the state sequencing of the faster device. In such cases, a "ready" control line is typically activated by the slower device to indicate to the faster device that data is available on the bus or has been taken from the bus.

Buses may be generally classified as synchronous or asynchronous, where synchronous buses are distinguished by the requirement that all bus devices synchronize their use of the bus by a single clock source (or a fundamental frequency). An example of a synchronous bus used in a microcomputer is the IBM PC AT I/O Channel, AT-bus or Industry Standard Architecture bus ("ISA-bus"). Present bus frequency standards for the ISA-bus are 8 MHz and 10 MHz.

The ISA-bus, an example of a synchronous bus, is used with the Intel 80386 microprocessor. The ISA-bus provides a 16-bit data bus and a 24-bit address bus. For purposes of this discussion, the control lines of the ISA-bus include four bus cycle definition lines. The bus cycle definition lines define the type of bus cycle being performed. (In the following definitions, and throughout the remainder of this patent document, all signal names that are terminated with an asterisk [*] indicate an active low signal). A bus cycle definition line called memory read ("MEMR*") is active when data is to be read from memory. A bus cycle definition line called memory write ("MEMW*") is active when data is to be written to memory. A bus cycle definition line called I/O read ("IOR*") is active when data is to be read from a peripheral device. A bus cycle definition line called I/O write ("IOW*") is active when data is to be written to a peripheral device.

In addition to the above-mentioned bus cycle definition signals there are some microprocessor specific signals that are used in most microcomputers for specifically interfacing the Intel 80×86 microprocessor family. There are two bus control signals and two bus arbitration signals of particular importance for bus interfacing. The bus control signals allow the microprocessor to indicate when a bus cycle has begun, and allows other bus devices to indicate a bus cycle termination. The address status ("ADS*") signal indicates that a valid bus cycle definition, and address, is being driven at the output pins of the 80386 microprocessor. The transfer acknowledge ("READY*") signal indicates that the current bus cycle is complete.

One skilled in the technology will understand the operation of the ISA-bus, other applicable industry standard buses, and the Intel 80×86 microprocessor family. At least two references are available on the subject including *The IBM PC from the Inside Out*, Revised Edition, by Murray Sargent III and Richard L. Shoemaker; and *IBM PC AT Technical Reference* published by IBM Corporation.

Synchronous buses are ordinarily preferred for microcomputers since they can often transfer data faster than asynchronous buses. Certain applications, however, especially where lengthy communication distances are involved, require asynchronous or "handshake only" type buses. When devices are separated by some distance, the same phase transition of a common clock cannot be guaranteed.

The primary disadvantage of the synchronous ISA-bus has only recently been recognized. Basically, microcomputers are evolving down two separate paths of variables: one set of variables is associated with the bus design and the other set is associated with the microprocessor and memory designs. A synchronous bus, such as the ISA-bus, should remain constant so that microcomputers in a single product line are all compatible. That is, a peripheral such as a modem, printer and so on will operate through a respective controller at the clock frequency defined in the bus specification. Therefore, the bus should only change through more efficient (i.e., cost effective) designs which meet the same specifications. For example, the operating frequency of the bus should remain constant to assure proper operation of all peripherals constructed in accordance with the bus standard.

In contrast, microprocessor and memory technologies are rapidly evolving in functionality and performance. For example, the microprocessor changes in architectural definition (e.g., number of pins, instruction sets, etc.) and clock frequency (e.g., 16 MHz, 25 MHz, 33 MHz), the cache becomes more sophisticated, coprocessors become a part of the microcomputer architecture (e.g., Intel 80387 numeric coprocessor), and main memory becomes faster.

As an example of memory evolution, consider dynamic random access memory, or "DRAM". As DRAM technology improves, the opportunity for improved system performance becomes clear. In the early days of personal computers, the common DRAM chip being used in microcomputers was 64K×1 (65,536×1 bits), having an access time of 150 nanoseconds. Recently, a standard (i.e., readily available and cost effective) DRAM size used by microcomputer manufacturers was 256K×1, having an access time of 100 nanoseconds. Presently, a DRAM chip standard of 1M×1 (i.e., 1,048,576×1 bits), having an access time of 80 nanoseconds or less is evolving as a commercially feasible standard, and the technology trend is toward a 16M by 1 bit chip.

It is desireable to isolate the memory and microprocessor from the synchronous I/O bus design so that different DRAM and microprocessors at different operating frequencies can be used without affecting the synchronous I/O bus design. Otherwise, if the synchronous bus is not isolated from the computation and storage elements, each technological improvement in memory or microprocessor products will require unique interface circuitry to scale-down communication speed with other devices across the synchronous bus.

Consequently, a need exists for improvements in microcomputer systems to isolate I/O channel design from memory and microprocessor designs.

SUMMARY OF THE INVENTION

The present invention relates to a computer system having a microprocessor, memory, synchronous bus, and synchronous bus peripherals. In addition, an asynchronous bus interface circuit is interposed between the microprocessor, memory and synchronous bus thereby allowing these computer components to be clocked by individual clock sources. However, standard peripherals designed for use with the synchronous bus may be used with the present invention.

By the use of the asynchronous bus circuit, technological improvements in the microprocessor and memory are decoupled from the relatively slower technological improvements in the synchronous bus. More specifically, computer system performance can be enhanced without increasing costs associated with the redesign of the interface to the industry standard I/O bus. Thus, economies of scale are realized by providing an industry standard I/O bus interface that can continue to be used without redesign as microprocessor and memory technologies evolve.

In the preferred embodiment of the present invention, the usual motherboard comprising a microprocessor, memory and synchronous bus has been decomposed into a processor module, one or more memory modules and a motherboard. The asynchronous bus interface is distributed among, and links, these various components of the computer system.

The asynchronous bus interface includes a number of control lines that carry handshake signals between the above-described system components. The handshake signals generally comprise a global address acknowledge ("GMINE*") signal that is asserted by a bus slave when an asynchronous bus, or "P-bus", address is recognized; a global start ("GSTART*") signal that is asserted by a bus master to initiate a bus cycle; a global ready ("GRDY*") signal that is asserted by the bus slave when the data transfer is completed; and a global end-of-cycle ("GEOC*") signal that is asserted by the bus master to terminate the bus cycle.

The preferred embodiment of the present invention is a computer system that comprises a first synchronous bus that operates in synchronism with a first clock signal having a first frequency. A microprocessor in electrical communication with the first synchronous bus is synchronized by the first clock at the first frequency. A second synchronous bus is synchronized by a second clock signal having a second frequency. The second clock signal operates asynchronously with respect to the first clock signal. The computer system further includes a plurality of bus circuits in electrical communication with the second synchronous bus for transferring data across the synchronous bus. An asynchronous bus is included. First and second bus interface circuits are also included. The first bus interface circuit provides electrical communication between the first synchronous bus and the asynchronous bus. The second bus interface circuit provides electrical communication between the second synchronous bus and the asynchronous bus. The first and second bus interface circuits have handshake lines for transmitting and receiving asynchronous handshake signals between the first and second synchronous buses via the asynchronous bus. The first and second bus interface circuits further transfer data between the first and second synchronous buses via the asynchronous bus. Preferably, the second synchronous bus is a standardized bus for computers having microprocessors.

Another aspect of the present invention is a microcomputer system that includes a standardized synchronous bus that communicates with a plurality of peripheral device controllers via a standardized communication protocol in synchronism with a first clock having a first predetermined clock frequency and a microprocessor that operates in synchronism with a second clock having a second clock frequency different from said first clock frequency. The microcomputer system comprises a synchronous processor bus that operates at the second frequency. The microprocessor is in communication with the synchronous processor bus. The microcomputer system also includes an asynchronous communication bus interposed between the standardized synchronous bus and the synchronous processor bus. The asynchronous communication bus provides asynchronous communication between the microprocessor and the standardized synchronous bus so that the second clock frequency can be changed without affecting the first clock frequency.

A further aspect of the invention is a microcomputer system that includes a microprocessor and a standard synchronous peripheral bus that provides electrical communication to a plurality of peripheral devices. The microcomputer system includes a motherboard onto which the standard synchronous peripheral bus is mounted. The motherboard includes a plurality of circuits in electrical communication with the standard synchronous peripheral bus. The plurality of circuits and the standard synchronous peripheral bus on the motherboard operate in synchronism with a first clock having a first frequency. A processor circuit board is included that is separate from the motherboard. The microprocessor is mounted on the processor circuit board. The processor circuit board includes a connector that provides electrical communication to the motherboard. The processor circuit board includes a plurality of circuits that support the operation of the microprocessor. The microprocessor and the plurality of circuits on the processor circuit board operating in synchronism with a second clock having a second frequency. The second clock operates asynchronously with respect to the first clock. The microcomputer system includes an asynchronous bus. A first bus interface circuit mounted on the motherboard provides electrical communication between the standard synchronous peripheral bus and the asynchronous bus. A second bus interface circuit mounted on the processor circuit board provides electrical communication between the microprocessor and the asynchronous bus.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like parts are designated with like numerals throughout.

Figure 1:
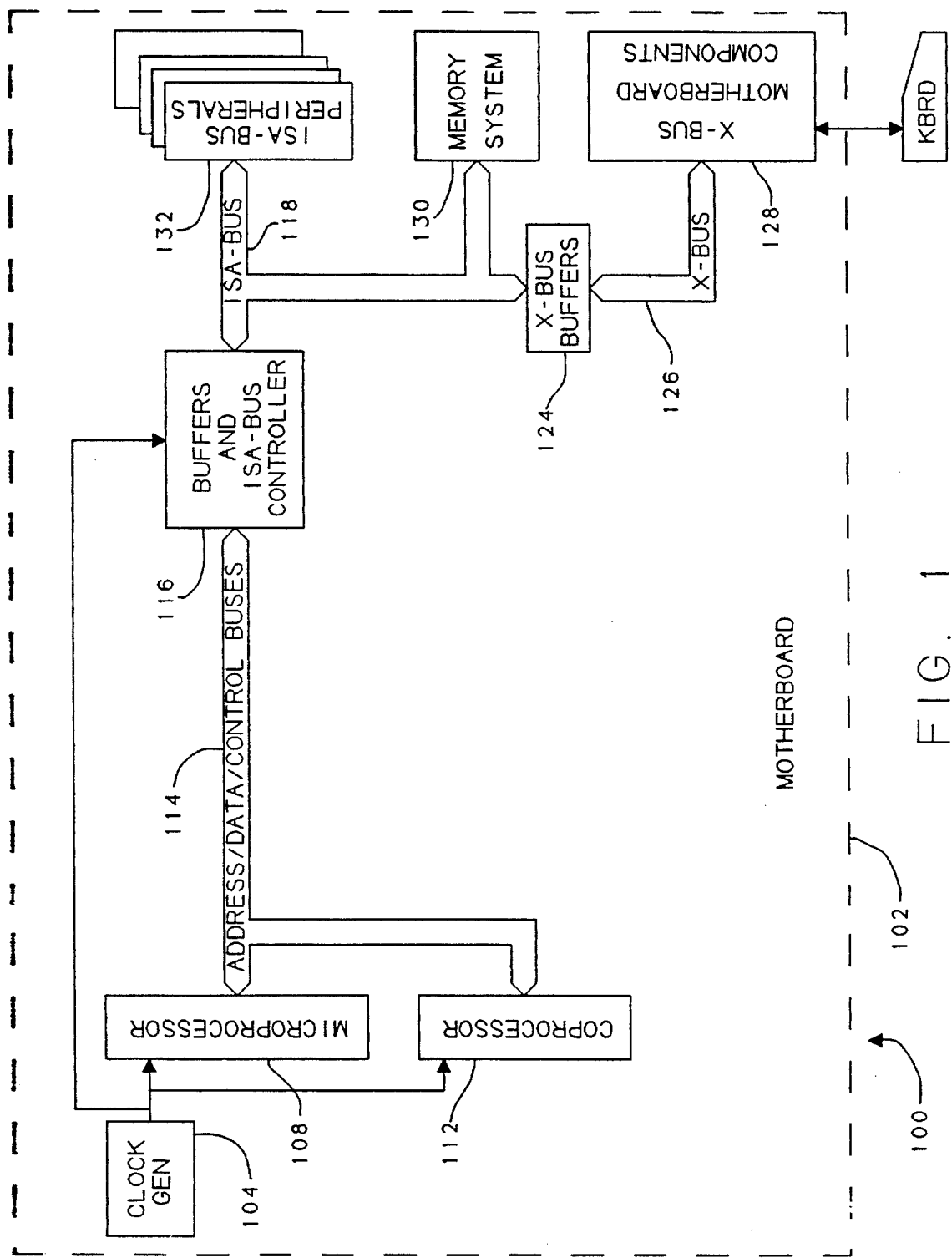
FIG. 1 is a block diagram of one prior art microcomputer system having an ISA-bus.

FIG. 1 illustrates a microcomputer system having an ISA-bus generally indicated at 100. The ISA-bus microcomputer system 100 shown in FIG. 1 is generally physically realized on a single printed circuit board called a motherboard 102 (delineated in dashed lines).

The microcomputer system 100 incorporates a clock generator 104 to supply the clock signal for the sequential logic (or timed logic) in the microcomputer system 100. Chief among the sequential logic circuits of the microcomputer system 100 receiving the clock signal is a microprocessor 108, for instance, an Intel 80386 semiconductor chip. The microprocessor 108 executes streams of computer program instructions to carry out any of a large number of computational functions. The basic computational functions of the microprocessor 108 are further enhanced by an optional coprocessor 112 that performs floating point operations. An Intel 80387 is an example of such a coprocessor.

The microprocessor 108 is in synchronous digital communication with other devices, such as memories and I/O peripherals, that are useful for storing and transferring information to the microprocessor 108. Communication with these other devices is achieved across an address, data and control bus 114 through a set of address, data and control buffers and controller 116. The outputs of the buffers and controller 116 comprise an ISA-bus 118, discussed above. The buffers and controller 116 is connected by the ISA-bus 118 to another set of address, data and control buffers 124. The output of the address, data and control buffers 124 is an X-bus 126 which is a subset of the ISA-bus standard that provides synchronous communication to conventional motherboard resident components 128, such as a keyboard controller, a DMA controller, and the like.

The ISA-bus 118 is also connected to a conventional synchronous memory subsystem 130 which provides main memory storage for the microprocessor 108. The ISA-bus 118 is also connected to a plurality of I/O expansion slots 132 which are used to electrically couple a plurality of conventional synchronous peripheral controllers to the microprocessor 108.

A detailed description of the ISA-bus 116 exists and can be found in *IBM PC AT Technical Reference Manual*, published by IBM and hereby incorporated by reference herein. No further discussion of the ISA-bus type microcomputer motherboard 102 is made herein as one who is skilled in the relevant technology will understand its function.

The ISA-bus 118 on the motherboard 102 shown in FIG. 1 is typically "clocked" by the clock generator 104 at either one of the present standards, i.e., 8 MHz or 10 MHz. However, an exemplary microprocessor 108 may be clocked at speeds as high as 50 MHz. Moreover, present RAM memories 136 may be clocked at higher speeds than can be accommodated by an 8 Mhz or 10 Mhz ISA-bus. Hence, present microcomputer motherboards need to be individually "tuned" with additional interface circuitry for the synchronous communication that must occur between the bus and the processor and memory components having divergent clock speeds. Thus, heretofore, each increase in the speed of a microprocessor or the system memory entailed a redesign of the microcomputer system to adapt the ISA-bus to higher speed components.

Figure 2:
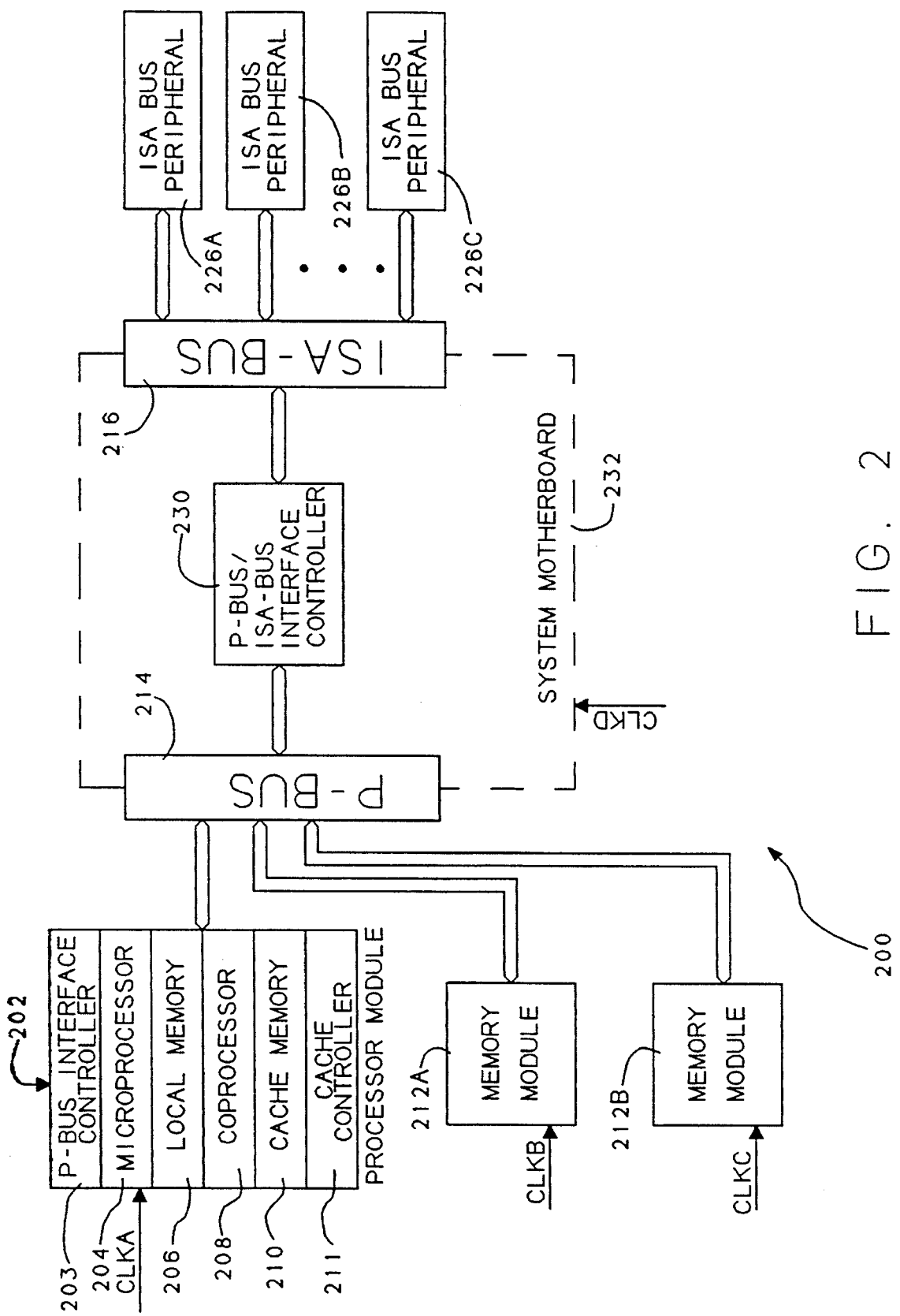
FIG. 2 is a block diagram of an exemplary microcomputer system in accordance with the present invention having the processor and memory modules connected to the asynchronous bus called the P-bus, and further having peripherals connected to a synchronous industry standard I/O bus.

FIG. 2 illustrates the preferred embodiment of a microcomputer system 200 that incorporates the present invention which effectively decouples the microprocessor and memory speeds from the speed of the ISA-bus or any other standard synchronous bus. (Although described herein in view of the ISA-bus, it should be understood that the present invention can be used in combination with other synchronous buses such as EISA ("Extended Industry Standard Architecture") and IBM MCA ("Microchannel Architecture").

The microcomputer system 200 includes a processor module 202 having a P-bus interface controller 203, a microprocessor 204, a local memory 206, a coprocessor 208, a cache memory 210 and a cache controller 211. In the preferred embodiment, the processor module 202 is physically realized in a single printed circuit board and the various functional elements 203, 204, 206, 208, 210, 211 are implemented in integrated circuits formed on semiconductor chips.

The microprocessor 204 can be any of a number of 16-bit, 32-bit or 64-bit microprocessors presently or soon to be available in the semiconductor chip marketplace. However, in the preferred embodiment, the microprocessor is one of the 80×86 family of products manufactured by Intel. At the present time, a particularly suitable microprocessor 204 is the Intel 80386, which operates on a clock frequency of 25 MHz or 33 MHz. However, the present invention is readily adaptable to other improved microprocessors, such as the Intel 80486, since the microprocessor is decoupled from the ISA-bus. The Intel 80×86 family of microprocessors is used in computer systems that operate using the ISA-bus and it is the basis for the following description. However, as set forth above, the present invention is applicable to other families of microprocessors and other microcomputer system bus standards.

Data storage for the microprocessor 204 is available locally in the local memory 206. The local memory 206 is preferably embodied in dynamic random access memory (DRAM) semiconductor chips. Since most standard operating systems, such as Unix and MS-DOS, require a minimum of one megabyte of DRAM, the local memory 206 is preferably sized accordingly with at least one megabyte of memory. In the preferred embodiment, the local memory 206 comprises four 256K×36 single in-line memory modules (SIMMs) manufactured by AST Research, Inc.

Although the aforementioned functional units, i.e., the microprocessor 204 and the local memory 206, form the essential components of the processor module 202, a faster and more effective processor module will include the coprocessor 208 and the cache 210, 211. The coprocessor 208 is typically a microprocessor that is optimized to perform floating point operations that are often required by a large number of scientific and engineering applications. For instance, the coprocessor 208 is implemented in the preferred embodiment by two semiconductor integrated circuits, the Intel 80387 and the Weitek 3167 coprocessor support chip. The processor module 202 may contain either chip or both chips depending upon the configuration.

The cache 210, 211 includes a fast access memory that conceptually relies on the theory of locality of references, the repeated addressing or memory accesses to a small group of memory locations by the microprocessor 202. By storing the data for a small group of frequently used addresses in the fast cache 210, 211, memory accesses generally become more efficient. In the preferred processor module 202, the cache 210, 211 includes the cache controller 211 which is typically a separate semiconductor chip such as the Intel 82385 and a cache data memory consisting of static random access memory (SRAM).

Since the functional units of the processor module 202 including the microprocessor 204, local memory 206, coprocessor 208 and cache 210, 211 are standard off-the-shelf products, one skilled in the art will comprehend their operation and interconnection.

A set of memory modules 212A, 212B is also shown in FIG. 2. Although only two are shown, additional memory modules 212 may be configured in the microcomputer system 200. The memory module 212, like the processor module 202, is preferably implemented in a single printed circuit board. The preferred memory module 212 supports up to 16 megabytes of the 256K×36 bit SIMMs, having an access time of 100 nanoseconds, or less.

The processor module 202 and the memory modules 212 are in digital communication across an asynchronous bus called the P-bus 214. The P-bus 214 includes a 32-bit data bus and a 32-bit address bus having an upper physical address limit of 4 gigabytes. Because the P-bus 214 is an asynchronous bus, the devices on the bus do not operate at, and there is no need for, a common clock frequency. Therefore, communication on the P-bus 214 is accomplished by a pure signal "handshake".

In the simplest form of handshake communication across a bus, a logic level change on a control line is initiated by a device requesting communication across the bus. In response, another logic level change on another communication line by a receiving device acknowledges the request.

In addition to the data address and control buses noted above, the P-bus includes a set of reset lines (not shown) to communicate the various reset command signals used in the typical ISA-bus system, such as a reset to the coprocessor 208, reset to the microprocessor 204, and a global reset to reset all semiconductor chips in communication across the P-bus 214. The P-bus 214 further includes arbitration logic (not shown) which is an asynchronous arbitration control for data transfers between peripherals and memory. In addition, a plurality of coprocessor exception handling control signals (not shown) are provided. Lastly, the P-bus 214 comprises interrupt logic (not shown) that provides the necessary signals for posting interrupts to the microprocessor 204.

The P-bus 214 is not the only bus included by the microcomputer system 200. The present invention also comprises an ISA-bus identified by the numeral 216 in FIGS. 2 and 3C. As illustrated in FIG. 3C, the ISA-bus 216 includes a 16-bit wide data bus 218, a 24-bit wide address bus 220 and a control bus 222 in accordance with the industry standard. The ISA-bus 216 of the present invention operates at a standard clock frequency of 8 MHz.

The ISA-bus 216 is incorporated into the preferred embodiment of the present microcomputer system 200 due to its standardized usage in the personal computer marketplace which includes business, scientific and engineering communities. Such widespread use has created a market for, and the implementation of, a significant number of I/O devices, or peripherals, for the ISA-bus 216. The ISA-bus 216 is thus shown to include a set of ISA-bus peripherals 226A, 226B and 226C, with the number of peripherals allowed only bounded by the specifications of the ISA-bus 216. Examples of ISA-bus peripherals include hard disk drive controllers, communication coprocessors, graphics coprocessors and flexible disk controllers.

The microcomputer system 200 also advantageously includes an X-bus such as was described above. However, since the X-bus is simply a buffered subset of the ISA-bus, it is not shown in FIG. 2, or FIG. 3C.

Lastly shown in FIG. 2 is a P-bus/ISA-bus interface controller 230. The P-bus/ISA-bus interface controller 230 and the connectors for the various signal paths grouped into the P-bus 214 and the ISA-bus 216 are preferably implemented on a single printed circuit board called a microcomputer motherboard 232.

The various buses 214, 216 on the microcomputer motherboard 232 are incompatible for a number of reasons, including bus width, control lines and timing. Therefore, the P-bus/ISA-bus interface controller 230 serves to translate digital signals between the P-bus 214 and ISA-bus 216.

As illustrated in FIG. 2, the processor module 202 is clocked at a frequency indicated by CLKA, the memory modules 212A, 212B are clocked at frequencies indicated by CLKB and CLKC, and the motherboard 232 is clocked at a frequency indicated by CLKD. The clock signals are actually generated on the modules 202, 212 and motherboard 232 but the CLKx lines emphasize that all the functional units 202, 212, 232 are operating asynchronously with respect to one another. Even if the clock frequencies are substantially equal, synchronization of the rising and falling edges of the clock signals (i.e., phases) cannot be guaranteed. Communication between the microcomputer boards 202, 212, 232 having sequential logic circuits clocked by incompatible clock frequencies is thus resolved by the asynchronous structure of the P-bus 214.

Figure 3A:
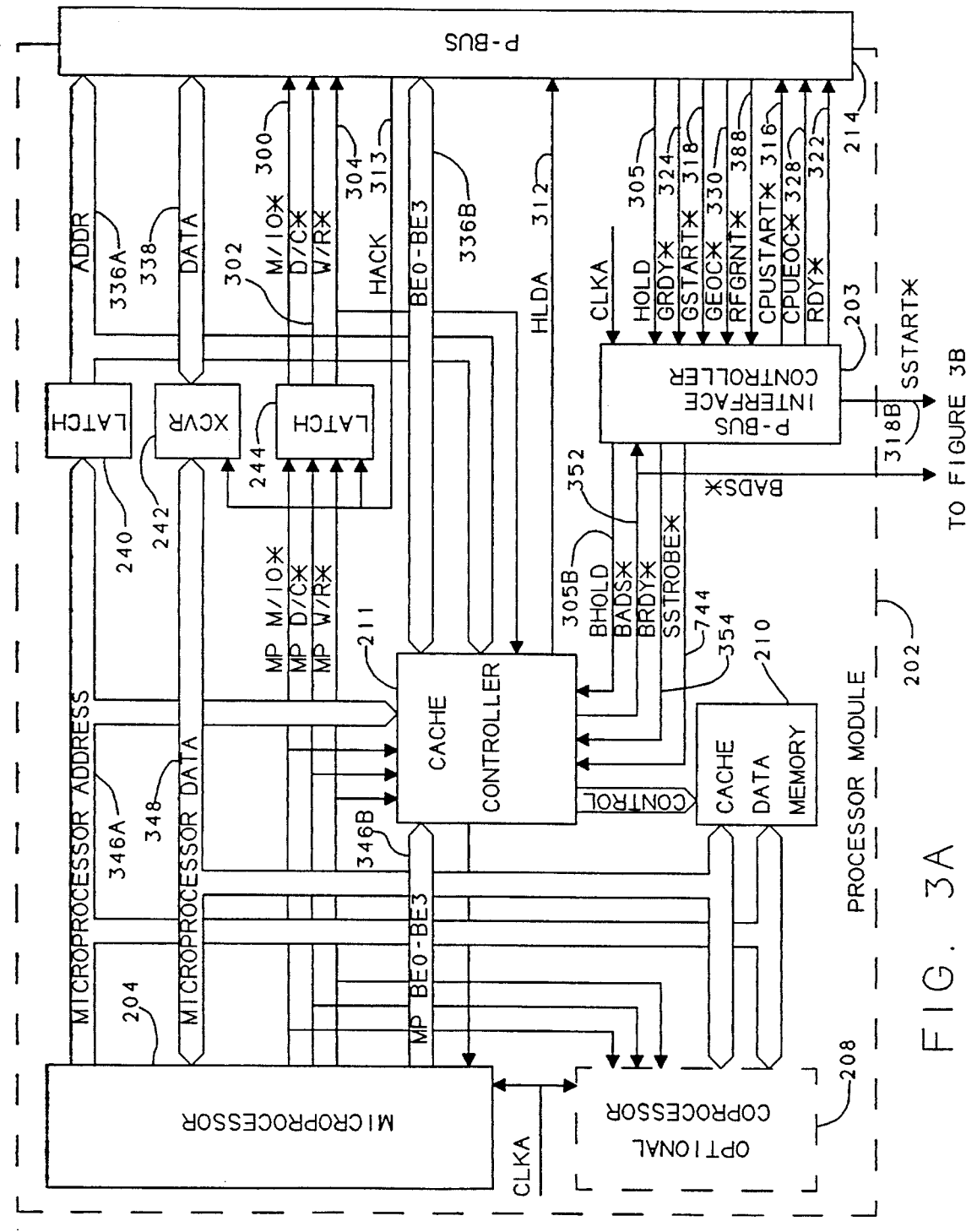
FIG. 3A is a block diagram showing the electrical connections in the portion of the processor module that includes the microprocessor, coprocessor, cache controller, cache memory and P-bus interface controller, and their respective connections to the P-bus.
Figure 3B:
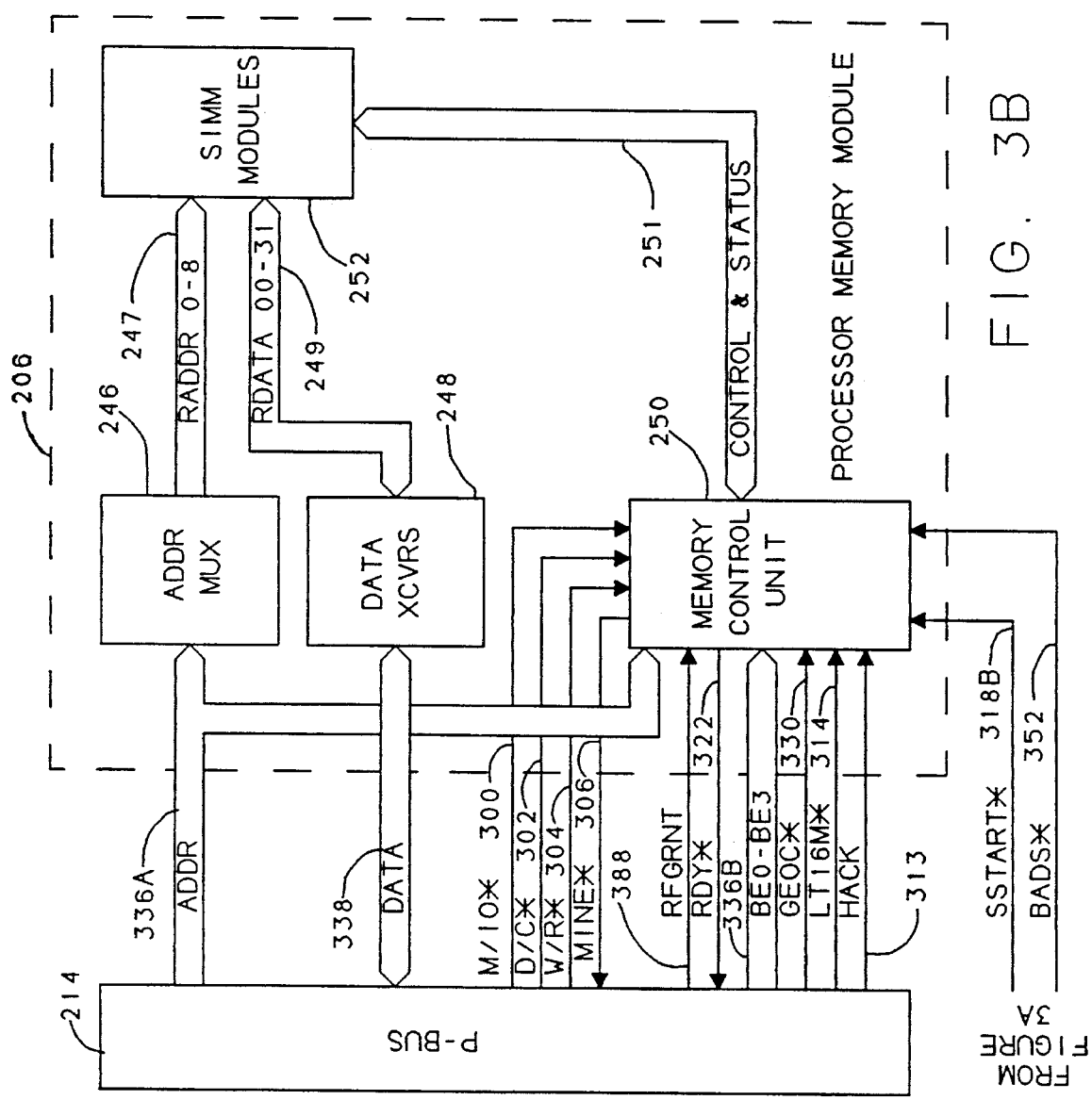
FIG. 3B is a block diagram showing the electrical connections in the portion of the processor module that includes the local memory, and its connections to the P-bus.
Figure 3C:
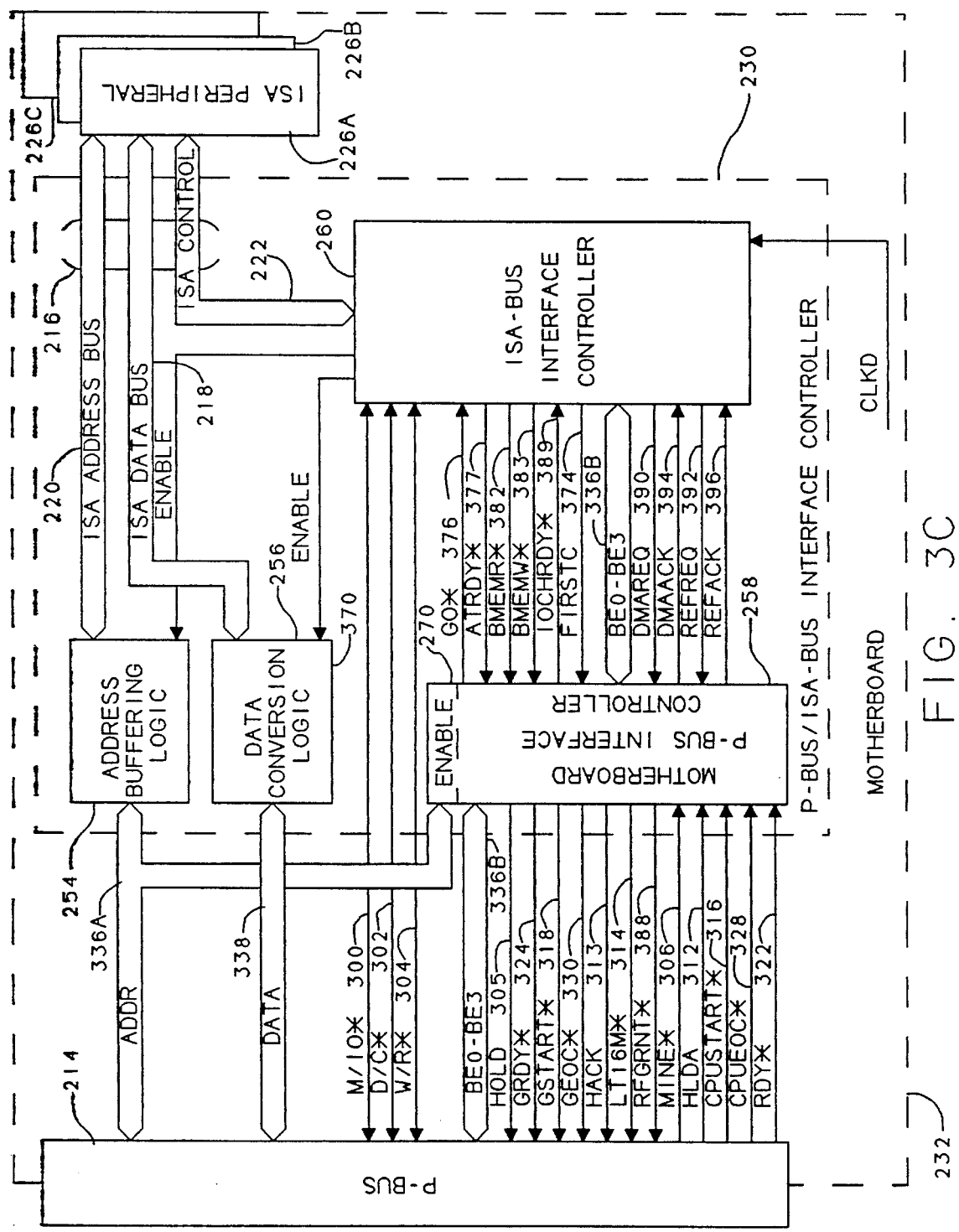
FIG. 3C is a block diagram showing the electrical connections of the microcomputer motherboard, and its connections to the P-bus and the ISA-bus.

FIGS. 3A, 3B and 3C illustrate the P-bus connections between the processor module 202 and the microcomputer motherboard 232. FIGS. 3A and 3B relate to the processor module 202 and FIG. 3C relates to the motherboard 232. The memory modules 212 shown in FIG. 2 are not shown in FIGS. 3A, 3B and 3C. However, P-bus connections from the motherboard 232 to the memory modules 212 are similar to P-bus connections from the motherboard 232 to the processor module 202. Thus, the P-bus connections to the memory modules 212 can be inferred from FIGS. 3A, 3B and 3C.

In FIG. 3A, the functional blocks of the processor module 202 introduced in FIG. 2, including P-bus interface controller 203, microprocessor 204, coprocessor 208, cache memory 210 and cache controller 211, are shown with their connections. In addition, an address latch 240, a data transceiver 242, and a control latch 244 are shown in FIG. 3A.

In FIG. 3B, the remaining functional block of the processor module 202 introduced in FIG. 2 and not shown in FIG. 3A, the local memory 206, is shown with its connections. The local memory 206 comprises an address multiplexer 246 that sequentially provides row and column addresses on a bus 247; a data transceiver 248 that provides data on a bus 249; a memory control unit 250 connected to a control and status bus 252; and a DRAM 252 having a number of SIMMs, such as those discussed above. The DRAM 252 is connected to the buses 247, 249, 251.

In FIG. 3C, the P-bus/ISA-bus interface controller 230 on the motherboard 232 is shown in greater detail. The P-bus/ISA-bus interface controller 230 comprises an address buffering logic circuit 254, a data conversion logic circuit 256, a P-bus interface controller 258 and an ISA-bus interface controller 260.

Referring to the P-bus 214 generally shown in FIGS. 3A, 3B and 3C, a memory or I/O ("M/IO*") line 300, a data or code ("D/C*") line 302, and a write or read ("W/R*") line 304 are bidirectional control lines between the motherboard 232 and the processor module 202. When the microprocessor 204 controls the P-bus 214, it controls the logic levels on the three control lines 300, 302, 304. When the motherboard 232 controls the P-bus 214, the motherboard 232 controls the logic levels on the three control lines 300, 302, 304. The signals on the M/IO* line 300, the W/R* line 304 and D/C* line 302 are encoded signals that are translated by the motherboard 232 into standard ISA-bus control signals: memory read (MEMR*), memory write (MEMW*), I/O read (IOR*) and I/O write (IOW*). The signals carried by the control lines 300, 302, 304 are controlled by the motherboard 232, for example, when an ISA-bus peripheral 218 such as a direct memory access (DMA) controller, accesses the local memory 136 on the processor module 202 (FIG. 3B). In such cases, a bus request ("BHOLD") line 305 is asserted by the motherboard 232 to request a memory access on the P-bus 214.

An address acknowledge ("MINE*") line 306 is output by the processor module 202. Each P-bus module, such as the processor module 202 or one of the memory modules 212 (FIG. 2), will have its own MINE* line 306. The MINE* line 306 is active when one of the P-bus modules 202, 212 acknowledges that the address on the P-bus 214 is within its address space. The handshake protocol of the P-bus 214 requires that each P-bus module 202, 212 drive its MINE* line 306 active as soon as address information is available on the P-bus 214 and recognized as its own address.

In response to an active signal on the MINE* line 306, a global address acknowledge line ("GMINE*") line (not shown) is activated by the motherboard 232. The GMINE* line represents a global signal to the P-bus 214 generated by ORing all of the MINE* lines from each P-bus module 202, 212 associated with the P-bus 214. If GMINE* is active, a data transfer occurs on the P-bus 214 without any intervention by the ISA-bus interface controller 260. If the GMINE* line is inactive and the address is less than 16 megabytes, the microcomputer motherboard 232 initiates a bus cycle on the ISA-bus 216.

A bus grant, or hold acknowledge, ("BHLDA") line 312 is output by the processor module 202. This line 312 is one of the outputs on the Intel 80385 cache controller 211 in the preferred embodiment. The BHLDA line 312 is activated after a bus transfer request has been made to the processor module 202 via the HOLD line 305 and the processor module 202 has released control of the P-bus 214.

A less-than-16 megabytes ("LT16M*") line 314 is output by the motherboard 232 to differentiate between addresses greater than or equal to 16 megabytes and addresses less than 16 megabytes. The LT16M* signal is used by the motherboard 232 to initiate an ISA-bus cycle when the LT16M* is active and the GMINE* signal is inactive. Thus, the motherboard 232 assures that a cycle is initiated if no other P-bus device responds to the address on the address bus during the current cycle.

A CPU start ("CPUSTART*") line 316 (the acronym "CPU" stands for central processor unit and can be thought of herein as referring to the microprocessor on the processor module 202) is output by the processor module 202 to indicate the start of a valid bus cycle by the microprocessor 204. If the bus cycle initiated by the microprocessor 204 is an access to an address less than 16 megabytes, and none of the P-bus modules 212 claim the address as their own (i.e., GMINE* is not active), then this signal initiates an ISA-bus cycle on the microprocessor motherboard 232.

A global start ("GSTART*") line 318 is output by the motherboard 232 to the P-bus 214. The GSTART* line 318 carries the signal produced by ORing the CPUSTART* line 316 and an ATSTART* line (not shown) 320. The ATSTART* line is a signal path that is local to the microcomputer motherboard 128 and its use with the ISA-bus 216 is analogous to the CPUSTART* line 316 used with the P-bus 214. The ATSTART* line is activated in response to ISA-bus DMA or other bus master memory access request. When the DMA controller or other bus master has gained control of the P-bus and generates an active memory read or write signal, the motherboard 232 generates the ATSTART* signal to indicate that the memory cycle has started.

A ready ("RDY*") line 322 is output by the processor module 202 and other RDY* lines are similarly output by the memory modules 212 shown in FIG. 2. The RDY* line 322 is activated when the processor module 202, functioning as a bus slave to an ISA-bus peripheral 218, determines that an access to local memory 206 may be completed without any further delay.

A global ready ("GRDY*") line 324 is output by the motherboard 232 when a ready line from any of the P-bus modules is active, or when the motherboard 232 has completed an ISA-bus cycle. Hence, the GRDY* line 324 can be thought of as the bus slave response to the GSTART* line 318 indicating that data is at that time being transferred between the bus master and the bus slave across the P-bus 214.

A CPU end-of-cycle ("CPUEOC") line 328 is used by the processor module 202 to output an end-of-cycle signal to the P-bus 214. The CPUEOC* line 328 is activated immediately after the end of the current bus cycle, i.e., when all data for the bus cycle has been transferred across the P-bus 214.

A global end-of-cycle ("GEOC") line 330 is an output of the motherboard 232. The signal carried by the GEOC* line 330 is produced by ORing the CPUEOC* line 328 and an ATEOC* line (not shown). The ATEOC* line is a line local to the motherboard 232 that is used to indicate an end-of-cycle condition during non-CPU cycles initiated by an ISA-bus device 218.

As well as the above-discussed P-bus control lines, the P-bus 214, as first introduced in FIG. 2, is shown in FIG. 3 to further comprise bidirectional P-bus address lines (PA2–PA31) 336A, byte selection lines (BE0*–BE3*) 336B and P-bus data lines (PD0–PD31) 338. A comparator circuit (not shown) is connected to the P-bus address lines 336A on the motherboard 232. The comparator circuit generates an active signal on the LT16M* line 314 when the most significant P-bus address lines (PA24–PA31) are inactive. The address buffering logic circuit 254 (FIG. 3C) is connected between the P-bus address lines 336A and the ISA-bus address lines 220 to provide signal isolation. The data conversion logic circuit 256 is connected between the P-bus data lines 338 and ISA-bus data lines 218 and operates as a data steering switch to convert between 8-bit, 16-bit, 24-bit or 32-bit data transfers on the P-bus 214 and 16-bit or 8-bit data transfers on the ISA-bus 216. The ISA-bus address and data bus lines 218, 220 are connected to the edge connector slots 140 (FIG. 1) that enable standard ISA-bus peripherals 218 such as, for example, floppy disk controllers, graphics controllers, modems and so forth, to be added to the ISA-bus 216. One skilled in the technology will comprehend the operation of the buffering and conversion circuits 254, 256 and thus, no further discussion will be directed thereto.

On the processor module 202 (FIG. 3A), the P-bus address lines 336A are latched by the latch 240 on output. The P-bus data lines 338 are buffered from the microprocessor 204 by the bidirectional transceiver 242. The M/IO*, D/C* and W/R* lines 300, 302, 304 are also latched on output by the latch 244. The transceiver 242 and the latch 244 are controlled by a HACK signal on a line 313 from the P-bus 214.

A set of synchronized address and data lines 346A, 348 corresponding to the P-bus address and data line 336A, 338 are connected to the microprocessor 204, coprocessor 208, cache memory 210 and local memory 206.

The P-bus interface controller 203 shown in FIG. 3A includes a control line synchronization circuit (not shown) which receives the GSTART* signal on the line 318 and generates a synchronized start signal on a SSTART* line 318B that is synchronized with the microprocessor clock CLKA and used by the processor memory module 206 during DMA memory cycles.

The cache controller 211 inputs a signal from the P-bus interface controller 203 on a BHOLD line 305B. The signal on the BHOLD line 305B corresponds to the signal on the HOLD line 305 that has been synchronized with the CLKA signal within the P-bus interface controller 203. The cache controller 211 outputs a signal to the P-bus interface controller 203 on a BHLDA line 312.

The cache controller 211 is also connected to the P-bus interface controller 203 by a buffered address select ("BADS*") line 352 and a buffered transfer acknowledge ("BRDY*") line 354. The active BADS* line 352 indicates that a valid bus cycle definition and address are being driven on the address lines 336A. The active BRDY* line 354 indicates that the current bus cycle is complete. The P-bus interface controller 203 also controls the handshake lines CPUSTART* 316 and CPUEOC* 328. The GSTART* and GRDY* lines 318, 324 are input from the motherboard 232. The function of the P-bus interface circuit 203 with respect to the lines 316, 328, 324 is more fully understood by referring to the state diagram description of FIG. 12 below.

Referring now to FIG. 3B, the memory control unit 250 receives synchronized address lines 336A and P-bus control lines MI/O* 300, D/C* 302, W/R* 304, LT16M* 314 and generates a signal on the MINE* line 306, indicating whether an access has been made to the local processor memory module 206. The memory control circuit 250 receives an active status signal from each SIMM 252 installed in SIMM sockets in the processor module 202. An empty SIMM socket has a corresponding inactive status signal. The control circuit 250 utilizes the status signals to determine whether the SIMM corresponding to a range of addresses is present in its respective SIMM socket. If an access is made to an address of a SIMM 252 that is present, the control circuit 250 activates the MINE* line 306 indicating that the address corresponds to an existing SIMM 252. Otherwise, if the address corresponds to an empty SIMM socket, the control circuit 250 does not activate the MINE* line 306. The memory control circuit 250 receives the BADS* line 352 and SSTART* line 318B and provides an active output on the RDY* line 322 when a memory cycle has been completed. In the preferred embodiment, the memory control unit 250 receives the HACK signal on the line 313 to distinguish between microprocessor initiated memory cycles (HACK inactive) and DMA initiated cycles (HACK active). One skilled in the art will understand how to implement the local memory control circuit.

Referring again to FIG. 3C, additional details of the structure of the motherboard 232 will be provided. As illustrated, the P-bus interface controller 258 provides handshaking between the P-bus 214 and the ISA-bus interface controller 260. The P-bus interface controller 258 includes a ISA-bus controller enable circuit 370 which will be described in more detail below in connection with FIG. 4.

The P-bus interface controller 258 is connected to the ISA-bus interface controller 260 by a GO* signal on a line 376. The GO* causes the ISA-bus interface controller 260 to initiate an ISA-bus cycle in response to signals from the microprocessor 204 via the P-bus 214. An ATRDY* signal on a line 377 from the ISA-bus interface controller 260 to the P-bus interface controller 258 is activated by the ISA-bus interface controller 260 when ISA-bus cycles initiated by the microprocessor 204 are completed in the case of memory read or I/O cycles. In the case of memory write cycles, the ATRDY* signal is activated prior to the completion of the ISA-bus write cycle. The ATRDY* signal is one of the OR'ed components of the GRDY* signal on the GRDY* line 324.

An IOCHRDY* signal on a line 389 is a standard ISA-bus signal that is generated by the P-bus interface controller 258 during DMA cycles to compensate for the asynchronous relationship between the P-bus 214 and the ISA-bus 216.

A FIRSTC signal on a line 374 is generated by the ISA-bus interface controller 260 to inform the P-bus interface controller 258 that no memory write cycles are in progress.

A BMEMR* signal on a line 382 and a BMEMW* signal on a line 383 are buffered versions of the memory read and memory write signals on the standard ISA control bus 222 in accordance with the industry standard.

The bidirectional BE0–BE3 signals are communicated through the P-bus interface controller 258 between the P-bus 214 and the ISA-bus interface controller 260. When the microprocessor 204 controls the ISA-bus, the ISA-bus interface controller 260 generates the conventional A0, A1 and BHE signals as defined in the specification for the ISA-bus. Conversely, when a DMA controller or other bus master controls the ISA-bus, the ISA-bus interface controller 260 translates A0, A1 and BHE to BE0–BE3.

The ISA-bus interface controller 260 communicates a conventional DMA request signal DMAREQ on a line 390 or a refresh request signal REFREQ on a line 392 line from the ISA-bus control lines 222 to the P-bus interface controller 258. The P-bus interface controller 258 activates the HOLD line 305. When an active HLDA signal on the line 312 is received by the P-bus interface controller 258, a corresponding acknowledge signal, a DMAACK signal on a line 394 or a REFACK signal on a line 396 is activated by the P-bus interface controller 258 to the ISA-bus interface controller 260 provided that the FIRSTC signal on the line 374 is active. At the same time, an active RFGRNT* is provided on a line 388 to the P-bus 214. The RFGRNT* line is provided as an input to the P-bus interface controller 203 on the processor module 202 (FIG. 3A).

The M/IO* signals 300, the D/C* signal 302 and the W/R* signal 304 are connected directly from the P-bus 214 to the ISA-bus interface controller 260.

Figure 4:
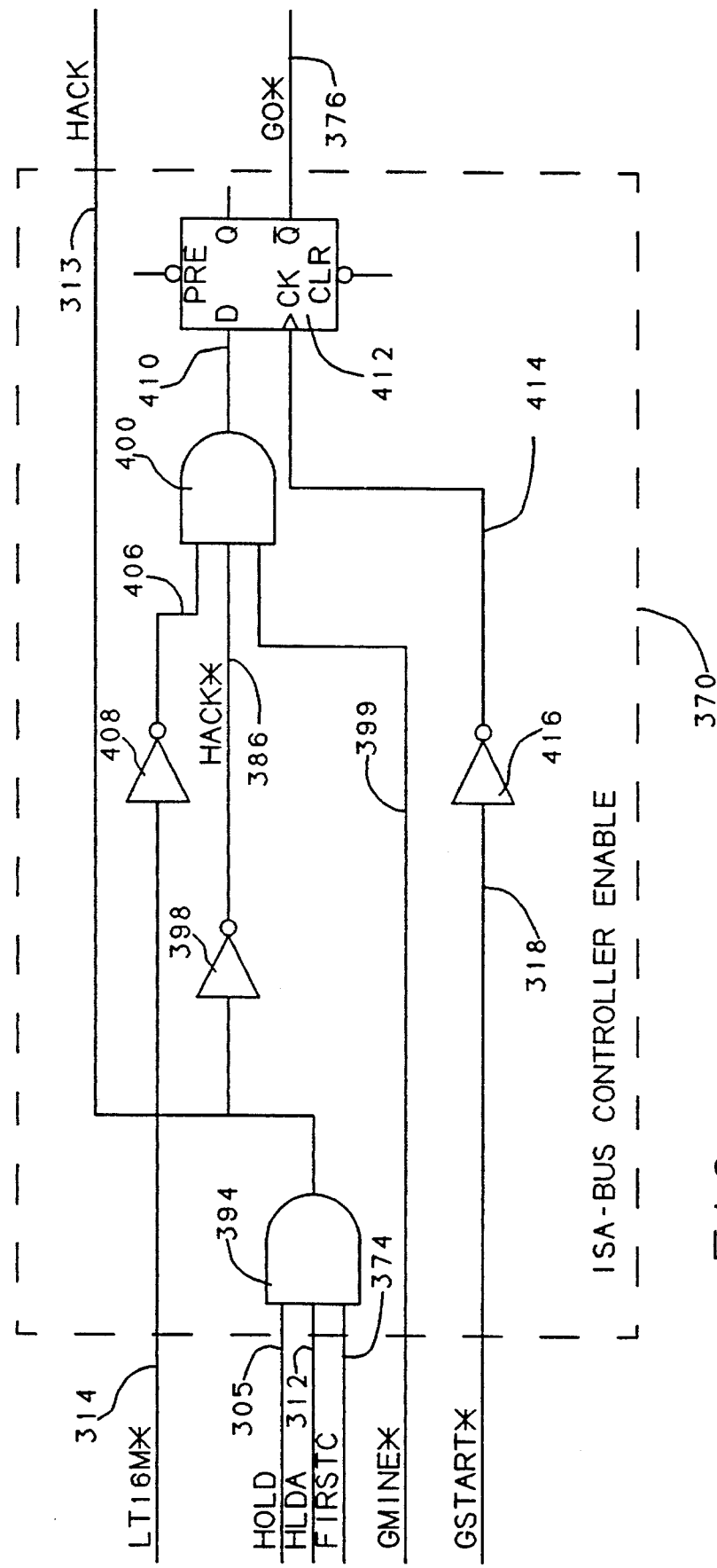
FIG. 4 is a logic schematic for the ISA-bus controller enable circuit that forms a part of the P-bus interface controller shown in FIG. 3C.

Referring now to FIG. 4, the controller enable circuit 370 initiates an ISA-bus cycle when the microprocessor 204 activates address lines in the range of an ISA-bus peripheral (i.e., less than 16 megabytes); the address is not claimed by a P-bus device; and a DMA or other bus master cycle is not currently active. The enable circuit 370 receives the HLDA line 312, the GSTART* line 318, the HOLD line 305 and a first cycle ("FIRSTC") line 374 as inputs. The enable circuit 370 outputs an ISA-bus controller enable line ("GO*") 376.

The ISA-bus controller enable circuit 370 will now be described in greater detail. An AND-gate 394 forms the conjunction of the HOLD, HLDA and FIRSTC lines 305, 312, 374. The AND-gate 394 outputs the HACK signal on the line 313. The HACK signal is inverted by an inverter 398. The output of the inverter 398 is provided as one input to an AND-gate 400 via a HACK* line 386, which, when inactive (e.g., high), indicates no DMA or other bus master activity on the ISA-bus 216. A second input to the AND-gate 400 is the GMINE* signal on the line 399 which is inactive high when no P-bus device has claimed the bus. Finally, a third input to the AND-gate 400 is an active high LT16M signal on a line 406 that is provided by inverting the LT16M* signal via an inverter 408. The output of the AND-gate 400 is an enable line 410 that indicates that the address is a valid ISA-bus address generated by the microprocessor 204 and that the bus is available. The enable line 410 is synchronized in a D-type latch 412. The clock signal for the latch 412 is a line 414 which carries the signal from the GSTART* line 318 that has been inverted by an inverter 416. The synchronous enable GO* line 376 is the inverted (i.e., active low) output of the latch 412.

The operation of the microcomputer system 200 is more fully understood by referring to the timing diagrams shown in FIGS. 5–10. In the timing diagrams of FIGS. 5–10, the horizontal axis of each logic signal represents time, and the vertical axis represents the logic level (i.e., High or Low) of the respective signal. The various timing signals are positioned in a vertical relationship to one another so as to indicate the cause-and-effect relationship between the logic transitions in the various signals.

Figure 5:
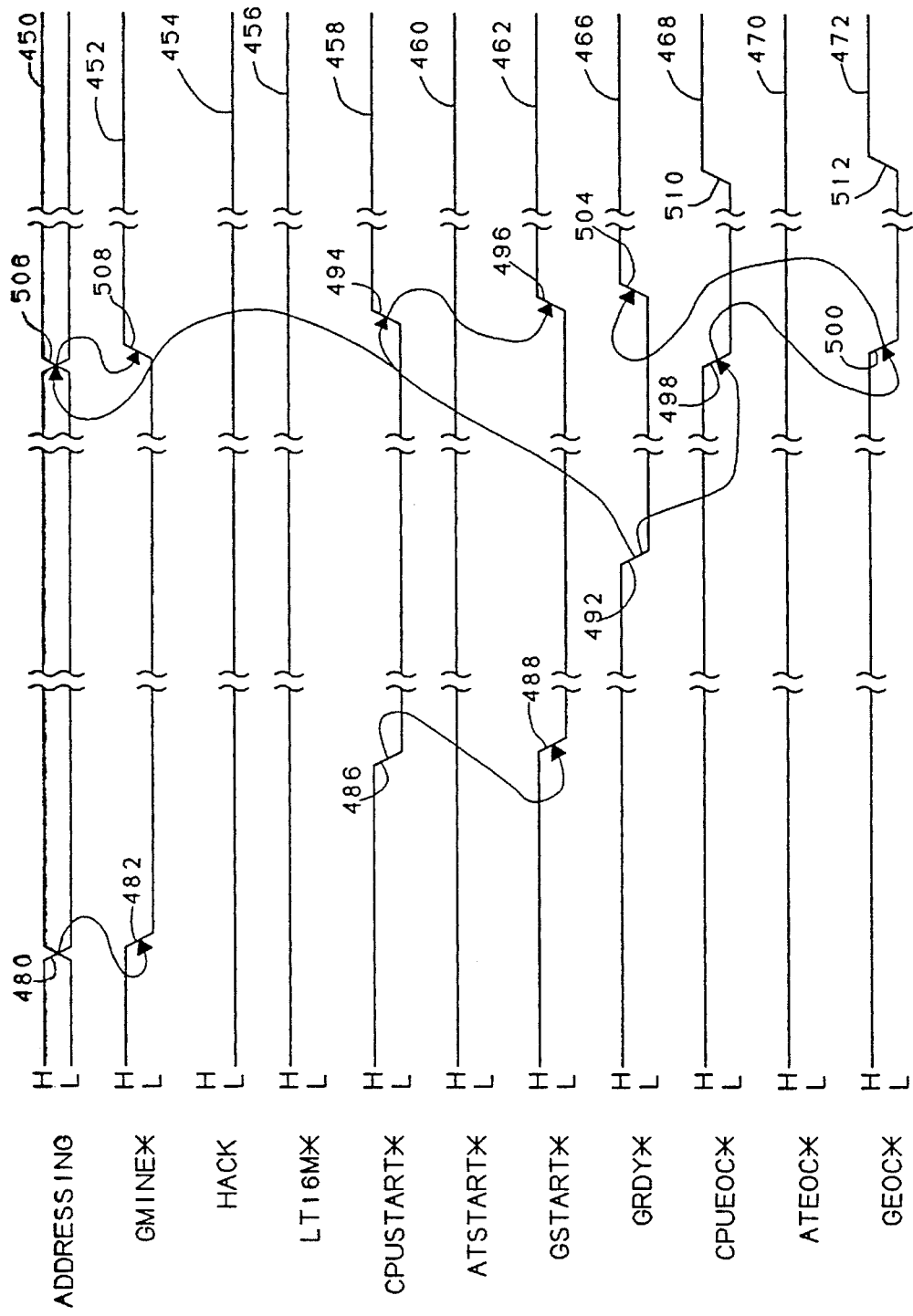
FIG. 5 is a timing diagram showing the microprocessor cycle to a P-bus device.

FIGS. 5–8 present the signal definitions for four types of data transfers between the P-bus 214 and the ISA-bus 216. FIG. 5 shows the various signal waveforms associated with the control lines of the P-bus 214, and certain related lines that are local to the motherboard 232. The signals represented in FIG. 5 are as follows: a generic ADDRESSING signal 450 that represents the state of the address lines, the byte selection lines (BE0–BE3) and the cycle definition control lines (M/IO*, D/C* and W/R*); a GMINE* signal 452; a HACK signal 454; an LT16M, signal 456; a CPUSTART* signal 458; an ATSTART* signal 460; a GSTART* signal 462; a RDY* signal 464; a GRDY* signal 466; a CPUEOC* signal 468; an ATEOC* signal 470 and a GEOC* signal 472. The ATSTART* and ATEOC* signals 460, 470 are signals that are only available internally to the motherboard P-bus interface controller 258.

The logic transitions of FIG. 5 represent a microprocessor cycle being generated to one of the P-bus devices 212 (FIG. 2). For example, the microprocessor 204, or bus master in this case, may be generating a read or write to the memory module 212, or bus slave in this case. Such a reference is made by inserting an address on the P-bus address lines 336A, the byte select lines 336B and the cycle definition control lines 300, 302, 304 (FIG. 3A) as represented by a transition 480 of the generic ADDRESSING signal 450. The P-bus modules 212 decode this information to determine if the cycle is one that is recognizable. The addressed module 212 drives its MINE* signal low resulting in the GMINE* signal 452 going low as indicated by a high-to-low transition 482. The HACK signal 454 is inactive throughout the microprocessor to P-bus cycle, indicating that there is now an active microprocessor cycle on the P-bus 214. The LT16M* signal 456 is inactive in the example shown. If the address is less than 16 megabytes, the LT16M* signal will become active. The CPUSTART* signal 458 is activated at a high-to-low transition 486. The motherboard translates the CPUSTART* transition 486, and the inactive ATSTART* signal 460, into the active global GSTART* signal 462 at a high-to-low transition 488. The addressed P-bus device 212 next indicates that it is ready to complete the CPU cycle by activating its respective RDY* signal (not shown) which is OR'ed with other RDY* signals on the motherboard 232 to cause the GRDY* signal 466 to make a high-to-low transition 492 to indicate the end of the data transfer cycle on the P-bus 214. The GRDY* signal 466 is synchronized by the P-bus interface controller 203 and causes the CPUSTART* signal 458 to go inactive at a low-to-high transition 494, which in turn causes the GSTART* signal 462 to become inactive at a low-to-high transition 496. The activation of the GRDY* signal 466 also causes the microprocessor 204 to deactivate the addressing lines as indicated by a transition 506 of the generic ADDRESSING signal 450. In one preferred embodiment, the address are latched and may remain active on the P-bus 214 until the beginning of the next cycle. The changing of the addressing lines may result in the deactivation of the GMINE* signal 452, as indicated by a transition 508, if the new address is not recognized by the presently addressed device.

The P-bus interface controller 203 then indicates that the cycle is over by driving the CPUEOC* signal 468 active as indicated by a high-to-low transition 498 which in turn causes the GEOC* signal 472 to make a high-to-low transition 500. The ATEOC* signal 470 remains inactive during this type of bus cycle. When the addressed module receives the active GEOC* signal, it will deactivate its respective RDY* signal (not shown) which causes the GRDY* signal 466 to become inactive at a low-to-high transition 504.

Figure 6:
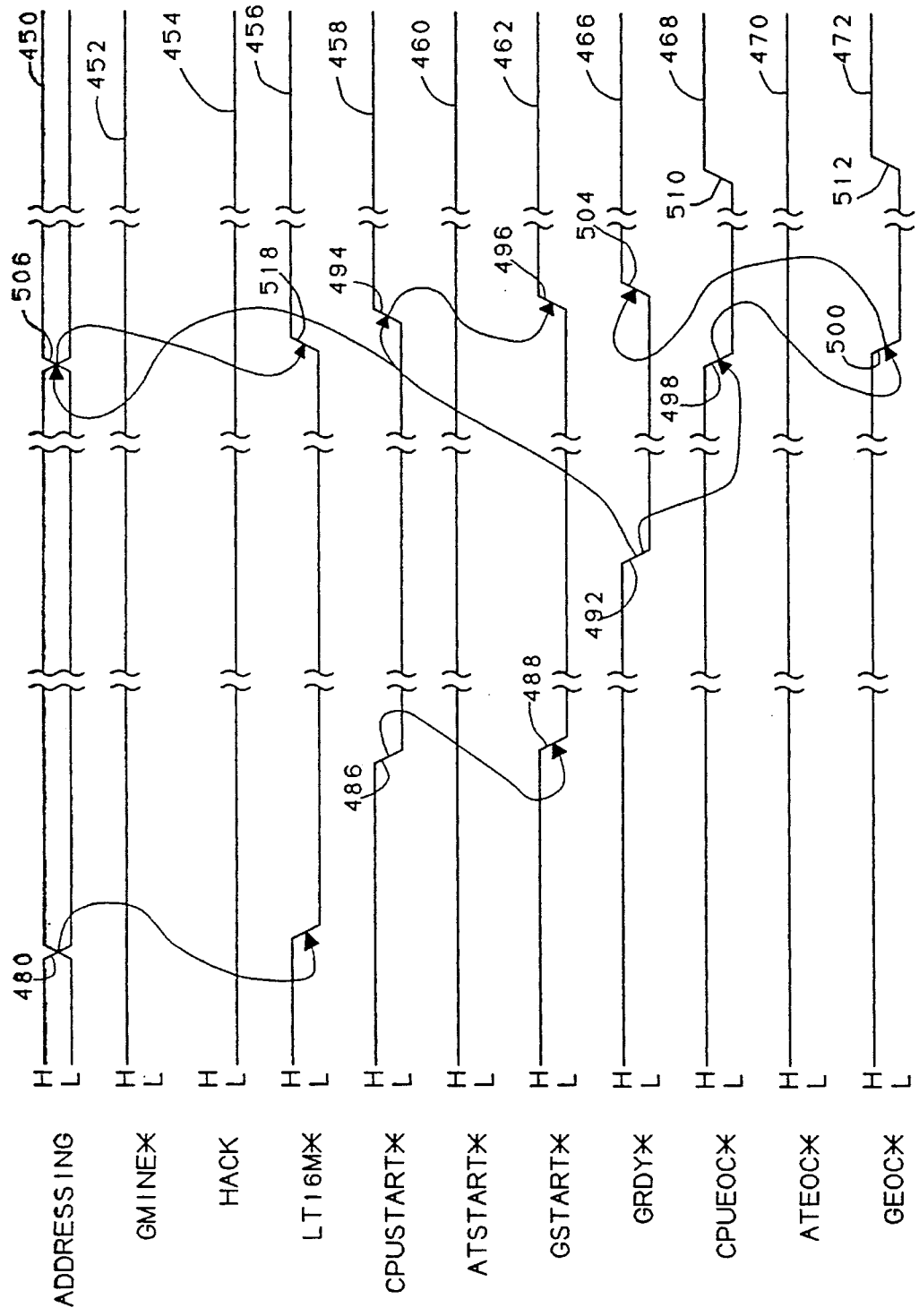
FIG. 6 is a timing diagram showing the microprocessor cycle to an ISA-bus device.

FIG. 6 illustrates the timing diagram associated with a microprocessor cycle to an ISA-bus device 226 (FIG. 2). Since the P-bus devices 212 are not involved, the GMINE* signal 452 are not active. Additionally, the motherboard handshaking signals ATSTART* 460 and ATEOC* 470 are not active for this type of bus transfer.

First, the address, byte select and bus cycle definition lines are activated on the P-bus lines 336A, 336B and 300, 302, 304 by the microprocessor 204 as discussed above in connection with FIG. 5. The LT16M* signal 456 makes a high-to-low transition 516 to indicate that the addressed device is within the 0–16 megabyte range of devices that may be on the ISA-bus 216. The remaining signals in FIG. 6 operate as described above in connection with FIG. 5. However, it should be noted that the transition 492 in the GRDY* signal 466 is caused by the activation of the ATRDY* signal 377 by the ISA-bus interface controller 260 on the motherboard 232. At the end of the cycle, the LT16M* signal makes a low-to-high transition 518 to its inactive state.

Figure 7:
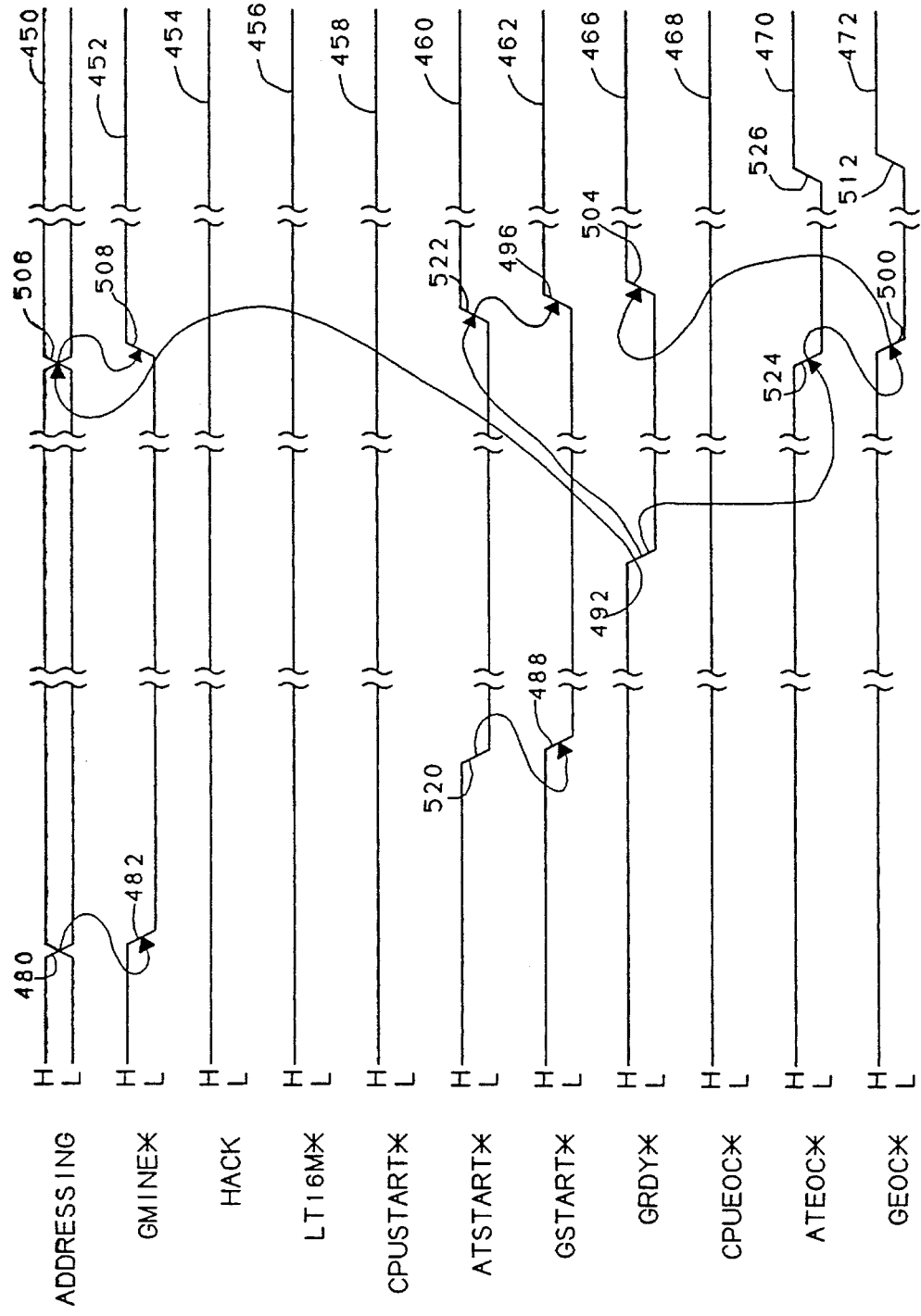
FIG. 7 is a timing diagram showing the non-microprocessor cycle to a P-bus device.

FIG. 7 illustrates the timing diagram for a non-microprocessor (i.e., DMA controller) bus cycle to a P-bus device 212 (FIG. 2). In this type of bus cycle, the HACK signal 454 is driven active due to an active HOLD signal on the HOLD line (FIG. 3C). The CPUSTART* signal 458 and the CPUEOC* signal 468 are not active since this bus cycle is not initiated by the microprocessor 204. The LT16M, signal 456 is also not active since this bus cycle is generated to a P-bus device 212 having an address greater than 16 megabytes.

The bus cycle begins when the addressing and cycle definition information is placed on the P-bus 214 and the addressed P-bus device 212 recognizes the address as its own by activating its respective MINE* signal which results in the transition 482 of the GMINE* signal 452. The P-bus interface controller 258 waits for an active BMEMR* or BMEMW* signal on the line 382 or the line 384 from the DMA controller or other ISA bus master device via the ISA-bus interface controller 260 and generates an active internal ATSTART* signal which results in the activation of the GSTART* signal 462, as indicated by the high-to-low transition 488. The addressed P-bus device 212 asserts its respective RDY* signal which results in the activation of the GRDY* signal 466 at the transition 492. The active GRDY* signal 466 causes the P-bus interface controller 258 to deactivate the ATSTART* signal at a transition 522. This in turn causes the deactivation of the GSTART* signal 462 as indicated by the transition 494. The remaining signals in FIG. 7 operate as in FIG. 5, discussed above, except that the ATEOC* signal 470 is activated by the motherboard P-bus interface controller 258 as indicated by a transition 524 to cause the activation of the GEOC* signal 472 to end the cycle. The ATEOC* signal 470 becomes inactive at a transition 526 resulting in the deactivation of the GEOC* signal 472 at the transition 512.

Figure 8:
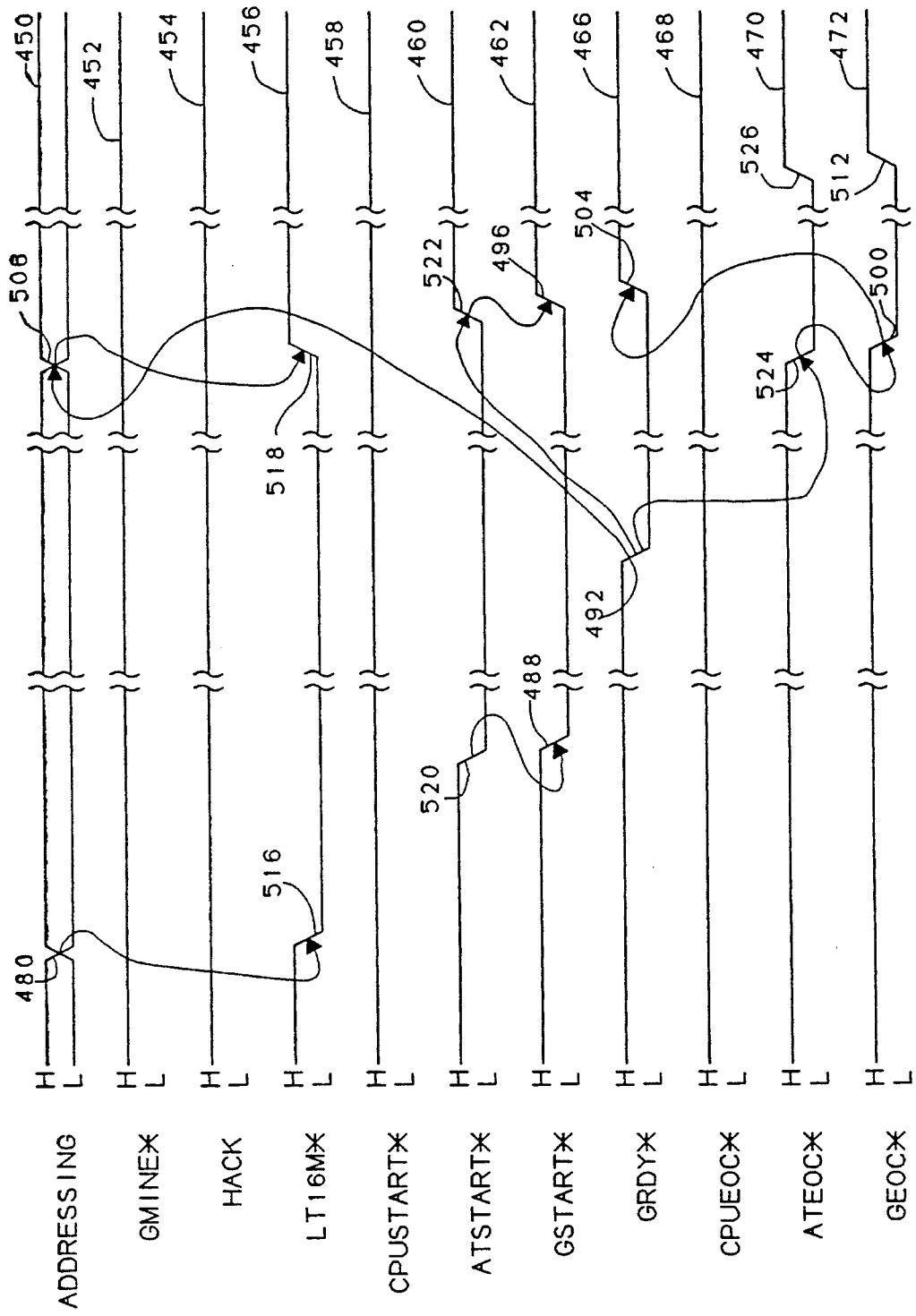
FIG. 8 is a timing diagram showing the non-microprocessor cycle to an ISA-bus device.

FIG. 8 illustrates a non-microprocessor bus cycle to an ISA-bus device 226A, B or C (FIG. 2). The GMINE* signal 452 is not active in this case because this bus cycle is not to a P-bus device. The HACK signal 454 is active during the cycle to indicate that there are no microprocessor originated cycles active anywhere in the microcomputer system 200. This cycle is similar to the cycle described with respect to FIG. 7 except that in this type of bus cycle, the LT16M* signal 456 is active to indicate that the addressing is within the range of an ISA-bus device. Since the GMINE* signal 452 is not active, the motherboard P-bus interface controller 258 assumes that the cycle is addressed to the ISA-bus 216. The remaining signals in the cycle of FIG. 8 operate as in the cycle of FIG. 7, discussed above, the only difference in the two cycles being that no data transfers actually occur on the P-bus which simply waits for the cycle to complete.

Figure 9:
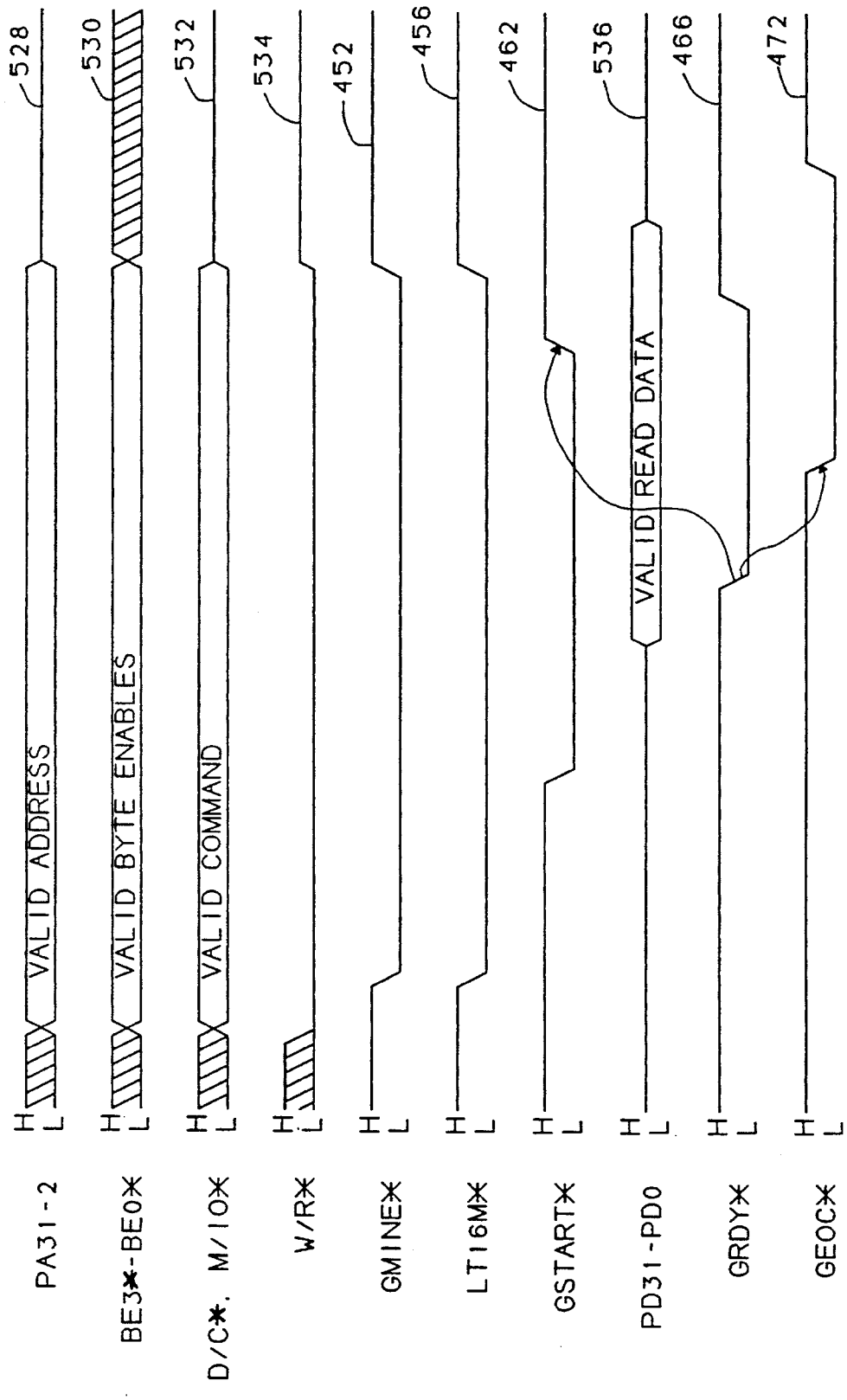
FIG. 9 is a timing diagram showing a read cycle on the P-bus.

FIGS. 5–8 illustrate the various asynchronous handshake signals necessary to coordinate data transfers across the P-bus 214. FIG. 9 shows some of the handshake signals which make up a complete read cycle to the P-bus 214. The following signals, not shown in FIGS. 5–8, are shown in more detail in FIG. 9: a set of P-bus address signals ("PA2–PA31") 528; a set of byte selection signals ("BE0*–BE3*") 530; the cycle definition control signals which comprise the D/C* and M/IO* signals represented together by a signal waveform 532 and the W/R* signal represented by a signal waveform 534; and a set of P-bus data signals ("PD0–PD31") 536.

Read cycles are initiated on the bus when the bus master drives the address signals 528, 530 and the control signals 532, 534 onto the P-bus 214. A read cycle is identified by a low logic level in the W/R* signal 534. These signals are decoded by the P-bus devices 212, and the addressed device 212 drives its MINE* signal (not shown) low, which in turn drives the global signal GMINE* 452 low. The LT16M* signal 456 is driven to a low logic level by the motherboard 232, if the address falls in the lowest 16 megabyte address space. As previously noted, all accesses to the ISA-bus 216 must have the LT16M* signal 456 driven low.

After giving sufficient time for these decodes to occur, the bus master drives one of the "start" signals (CPUSTART* 458 or ATSTART* 460, shown in FIGS. 5–8) low indicated by the GSTART* signal 462, to indicate the start of a valid cycle on the P-bus 214. The addressed device, or bus slave 218, drives valid data onto the P-bus 214 and activates the GRDY* signal 466. The bus master terminates the cycle by activating the global signal GEOC* 472. The global signal GRDY* 466 is deactivated by the high-to-low going edge of the GEOC* signal 472. The transmission of I/O signals to the P-bus 214 from the motherboard 232 is not supported by the preferred embodiment. However, additional circuitry could be added to the motherboard 232 to take such a function into account.

Figure 10:
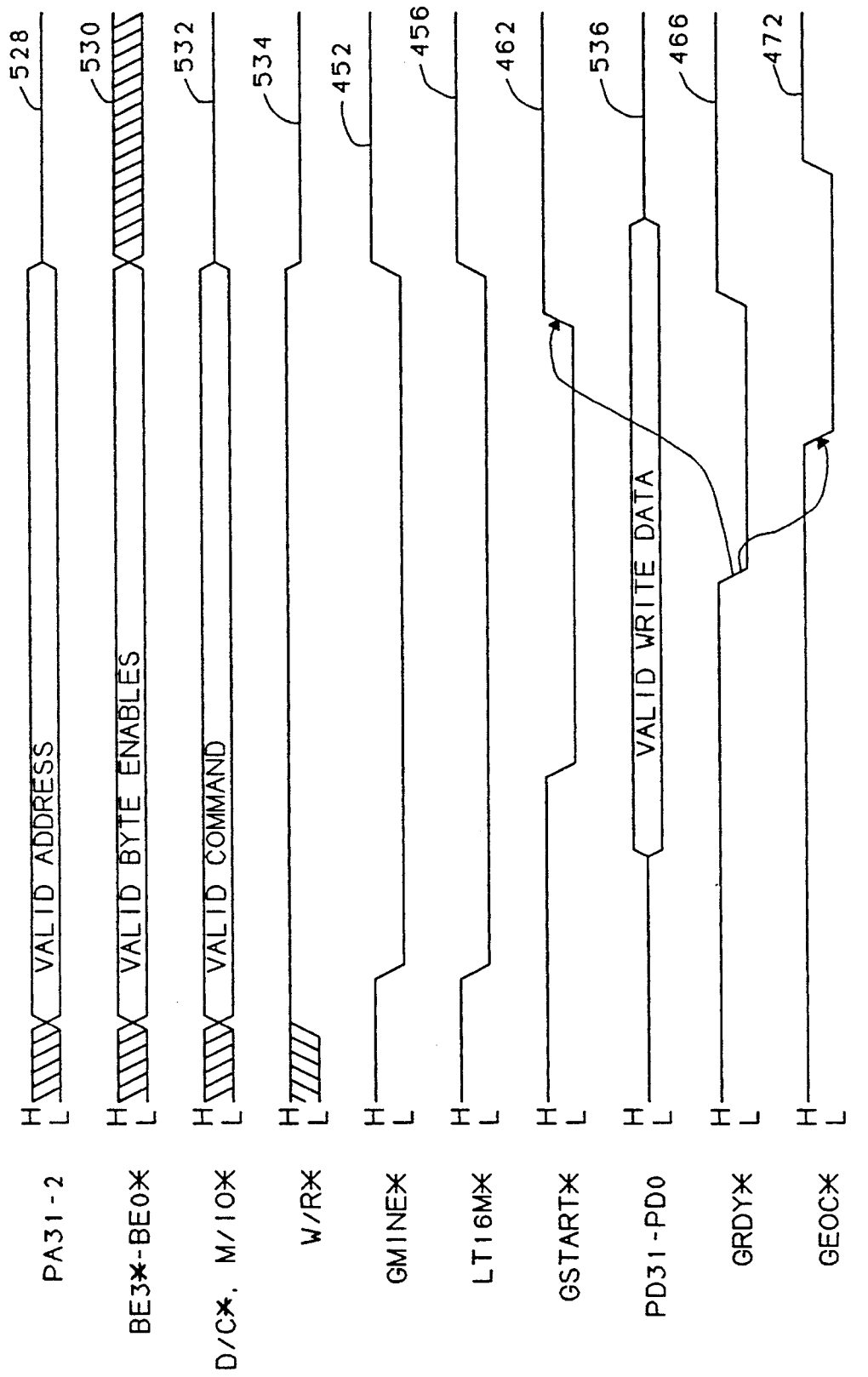
FIG. 10 is a timing diagram showing a write cycle on the P-bus.

FIG. 10 presents the same signals as shown in FIG. 9, with the exception that FIG. 10 illustrates a write cycle to the P-bus 214. A write cycle in the P-bus 214 is initiated when the bus master actively drives the address signals, byte selection signals and control signals 528, 530, 532, 534 onto the P-bus 214. The write cycle is identified by a high logic level on the W/R* signal 534. The motherboard 232 decodes this address information and drives the LT16M, signal 456 low for addresses under 16 megabytes. P-bus devices 212 decode the address and command information, and drive the GMINE* signal 452 low.

The bus master then drives valid data onto the P-bus 214 and activates the GSTART* signal 462. The bus master then waits for the GRDY* signal 466 to be activated and keeps the data signals 466 active until then. The bus master terminates the cycle upon receiving the GRDY* signal 466 from the P-bus 214. The P-bus 214 is informed of cycle completion by low-going GEOC* signal 472, which also deactivates the GRDY* signal 466.

Figure 11:
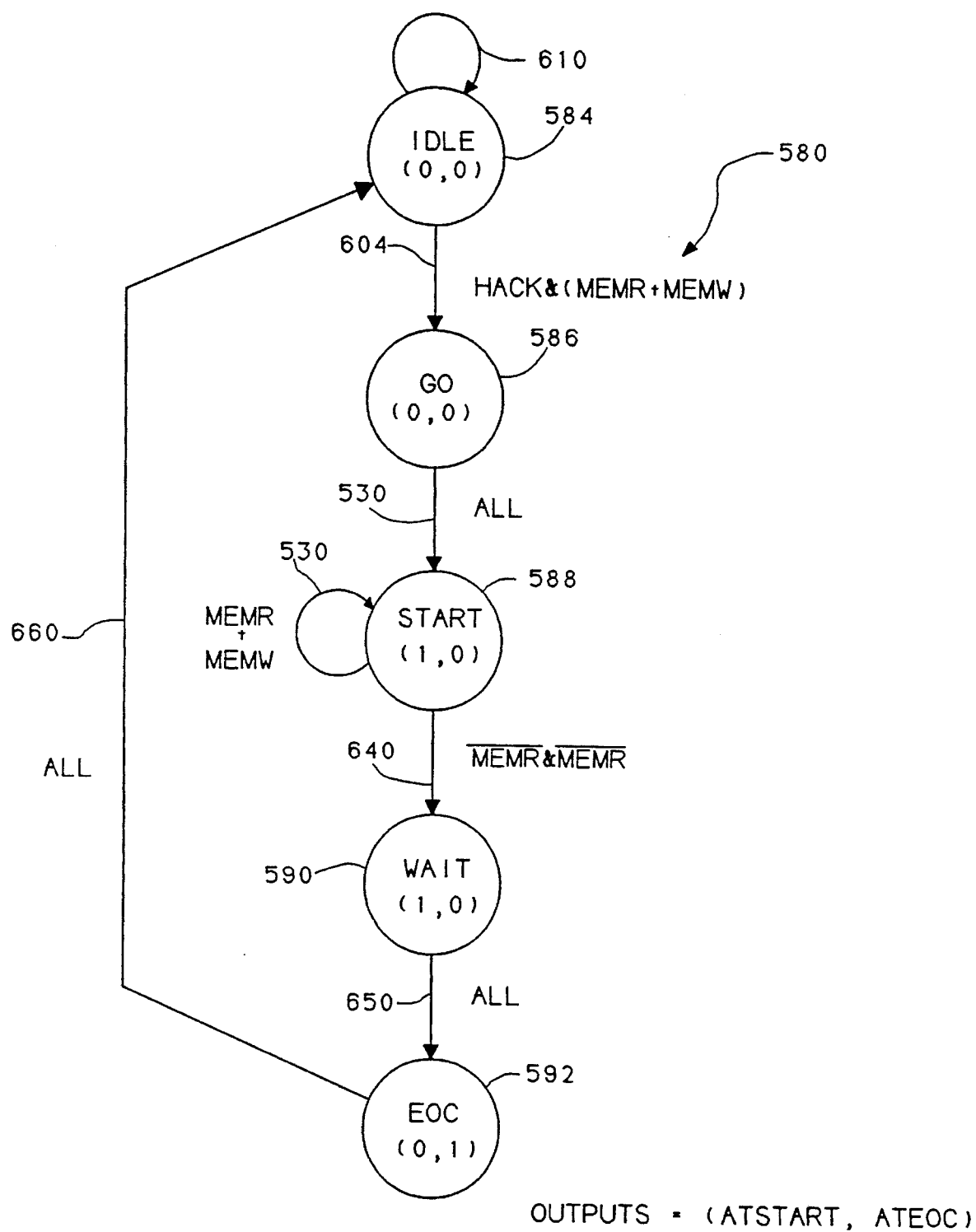
FIG. 11 is a state diagram for a portion of the P-bus interface controller circuit on the motherboard shown in FIG. 3C.

FIG. 11 represents a state transition diagram generally indicated at 580 for the preferred embodiment of a portion of the P-bus interface controller circuit 258, as shown in FIG. 3C. The P-bus interface circuit 258, as depicted by the state transition diagram of FIG. 11, can be physically realized as a programmable array logic (PAL) integrated circuit such as, for example, a PAL16r4–10 manufactured and sold by Monolithic Memories, Inc. Those skilled in the relevant technology will understand how to translate the state transition diagram of FIG. 11 into such a PAL.

The state transition diagram 580 of FIG. 11 includes five unique states: IDLE 584, GO 586, START 588, WAIT 590 and EOC 592. The states are represented in a conventional manner by circles on the state diagram. Within in each circle, a pair of numbers in parentheses represent the ATSTART* and ATEOC* outputs of the P-bus interface controller 258. In particular, "(0,0)" indicates that both, outputs are inactive; "(0,1)" indicates that the ATEOC* signal is active; and "(1,0)" indicates that the ATSTART* signal is active.

The IDLE state 584 is the default state where the motherboard P-bus interface controller 258 awaits the assertion of a DMA or ISA bus master activity request. One transition 604 from the IDLE state 584 occurs when the input combination of active lines BMEMR* 382 or BMEMW* 384 and HACK 313, that is, an active read or write request from a DMA controller or an ISA bus master and an indication that there is no other activity on the P-bus 216. There is no output on this transition 604. It should be noted that in the transition diagrams of FIGS. 11 and 12, the *'s indicating negative logic are not used. A signal name with a bar above it is the inactive state, and a signal name without a bar above it is the active state irrespective of whether the signal is active high or low.

A transition 610 is made from the IDLE state 584 back to the IDLE state 584 if neither of the foregoing input combinations is present.

The GO state 586 represents a clock cycle delay that synchronizes the memory request with the motherboard clock (CLKD). The motherboard P-bus interface controller 258 remains in the GO state 586 for only a single clock cycle and makes a transition 620 to the START state 588 irrespective of the input combinations being applied as indicated by the word "ALL" adjacent the transition. The ATSTART* lines is activated upon the transition 620.

As indicated by a transition 630 from the START state 588 to the START state 588, the motherboard P-bus interface controller 258 remains in the START state 588 until the deassertion of the BMEMR* signal or the BMEMW* signal that caused the initial transition 604 to the GO state 586.

A transition 640 is made from the START state 588 to the WAIT state 590 when both the BMEMR* and BMEMW* signals are inactive. The WAIT state 590 is included to synchronize the deactivation of the BMEMR* and BMEMW* signals with the motherboard clock (CLKD). The P-bus interface controller 258 remains in the WAIT state 590 for only a single cycle and makes a transition 650 to the EOC state 592 irrespective of the input combinations.

Upon the transition 650 to the EOC state 592, the ATSTART* signal is deactivated and the ATEOC* signal is activated which notifies the P-bus 214 that the current bus cycle is complete. The motherboard P-bus interface controller 258 remains in the EOC state 592 for a single cycle and then makes a transition 660 to the IDLE state 584 at which time it deactivates the EOC* signal.

The motherboard P-bus interface controller 258 also provides outputs not shown by the state transition diagram 580. These outputs can be implemented as discussed below. The IOCHRDY line 389 is enabled when the HACK 313 and GMINE* lines are active and the REFGNT* line 388 is inactive and is responsive to the state of the GRDY* line 324. The IOCHRDY line 389 is used to stop a ISA bus master until it has been verified that the current cycle on the P-bus 214 has been completed. Thereafter, the bus master is allowed to complete its cycle.

The M/IO* line 300 is active when the BMEMR* 382, BMEMW* 383 or ATSTART* lines are active, and is enabled when the HACK line 313 is active. The D/C* line 302 is always active high, and is enabled when the HACK line 313 is active. The W/R* line 304 is active high when the BMEMW* line 383 is active, and is enabled when the HACK line 313 is active.

Figure 12:
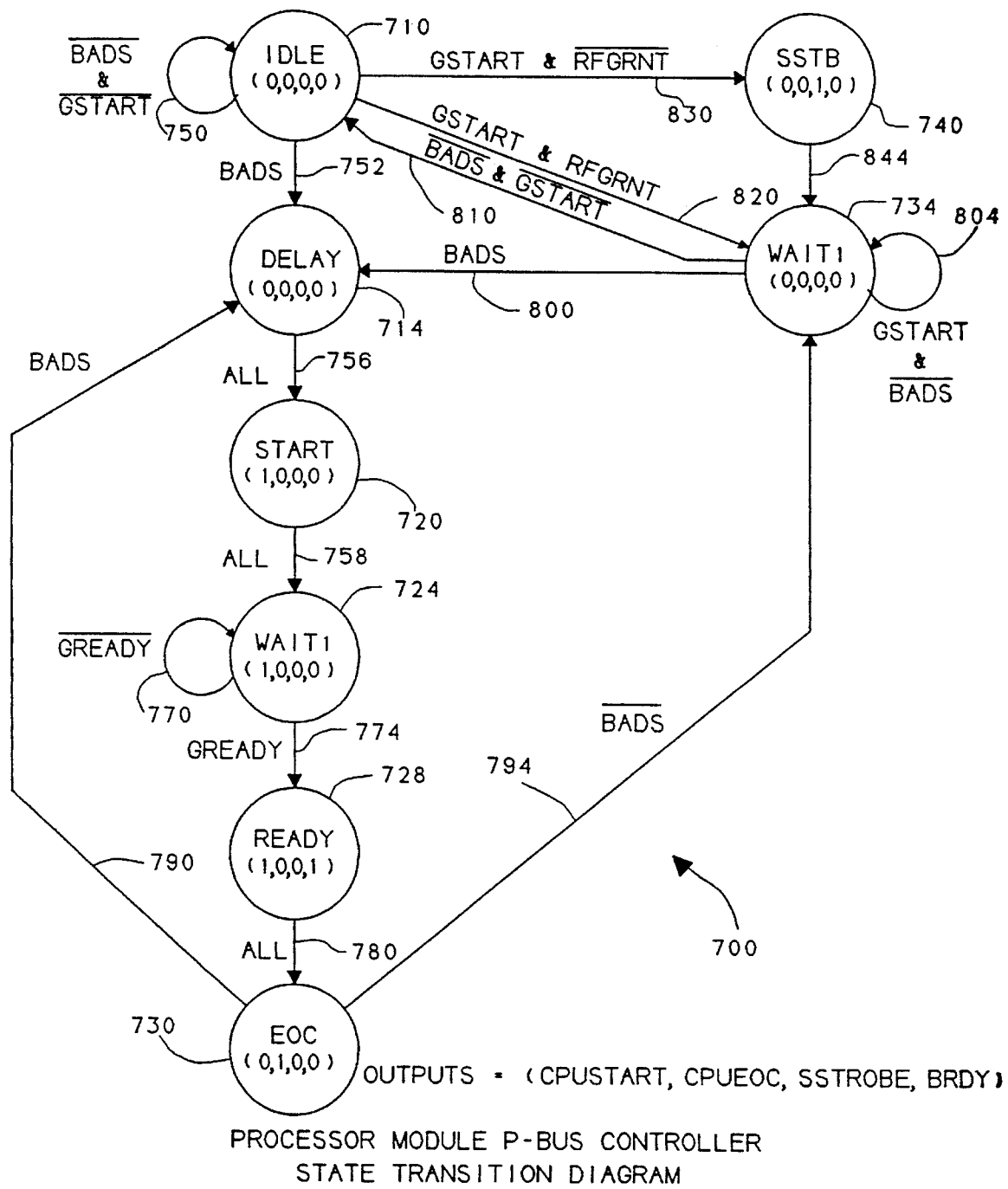
FIG. 12 is a state diagram for a portion of the P-bus interface controller circuit on the processor module shown in FIG. 3A.

FIG. 12 illustrates a state transition diagram generally indicated at 700 corresponding to a part of the function performed by the P-bus interface controller 203 shown in FIG. 3A. The state transition diagram 640 can be implemented on a PAL integrated circuit such as, for example, a PAL16r8–10 manufactured and sold by Monolithic Memories, Inc., among others.

This state transition diagram 640 contains the following states: IDLE 710; DELAY 714; START 720; WAIT1 724; READY 728; EOC 730; WAIT2 734 AND SSTB 740. Within each state, the numbers in parentheses represent the outputs from the P-bus interface controller 203, with the first number representing CPUSTART*, the second number representing CPUEOC*, the third number representing a signal SSTROBE*, and the fourth number representing the signal BRDY* For example, an entry of "1,0,0,0" indicates that the CPUSTART* signal is active and the other three signals are inactive.

The CPUSTART* signal, the CPUEOC* signal and the BRDY* signal have been described above. Referring briefly to FIG. 3A, a SSTROBE* signal line 744 from the P-bus interface controller 203 to the cache controller 211 is a single that is activated to inform the cache Controller 211 that a DMA cycle is occurring. The cache controller 211 uses the signal to selectively invalidate a cache entry in a conventional manner.

The IDLE state 710 is the default state in which the P-bus interface controller 203 remains until certain input combinations are received as indicated by a transition 750 from the IDLE state 710 to the IDLE state 710. In the IDLE state 710, the four outputs are inactive.

When an active BADS* signal is received, a transition 752 occurs from the IDLE state to the DELAY state 714. No outputs are activated by this transition. The purpose of the DELAY state 714 is to provide address setup time before continuing with a cycle. After one clock cycle, a transition 756 occurs to the START state 720 irrespective of the input combinations, and the CPUSTART* signal is activated. The P-bus interface controller 203 remains in the START state 720 for a single clock cycle and makes a transition 758 to the WAIT1 state 724 irrespective of the input combinations. The CPUSTART* signal remains active.

The P-bus interface controller 203 remains in the WAIT1 state 724 while GREADY* is inactive as indicated by the transition 770. When the GREADY* signal becomes active, a transition 774 occurs to the READY state 728 where the P-bus interface controller 203 remains for one clock cycle. The BRDY* signal is activated upon the transition 774 to inform the cache controller 211 that the addressed device has responded. Thus, the READY state 728 operates to synchronize the device ready signal with the high speed processor clock. The CPUSTART* signal remains active in the READY state 728.

After remaining in the READY state 728 for one clock cycle, the P-bus interface controller 203 makes a transition 780 to the EOC state 730 at which time the CPUSTART* and BRDY* signals are deactivated and the CPUEOC* signal is activated. The P-bus interface controller 203 remains in the EOC state for a single clock cycle. If the BADS signal is active at the end of the clock cycle, the P-bus interface controller 203 makes a transition 790 from the EOC state 730 to the DELAY state 714 at which time it deactivates the EOC* signal. On the other hand, if the BADS* signal is inactive at this time, a transition 794 is made to the WAIT2 state 734 and the EOC* signal is deactivated.

In the WAIT2 state 734, the P-bus interface controller 203 monitors the BADS* signal and the GSTART* signal. If the BADS signal occurs, a transition 800 is made to the DELAY state 714. If the GSTART* signal has not yet been deactivated, a transition 804 causes the P-bus interface controller 203 to remain in the WAIT2 state 734. Otherwise, if the BADS* signal and the GSTART* signal are both inactive, a transition 810 is made back to the IDLE state 710.

Returning again to the IDLE state 710, if GSTART* becomes active at the same time as RFGRNT* is active, then a transition 820 is made to the WAIT2 state 734 to wait until GSTART* becomes inactive or BADS* becomes active, as described above.

If, while in the IDLE state 710, GSTART* becomes active when RFGRNT* is inactive to indicate that a DMA or other bus master cycle has started, a transition 830 is made to the SSTB state 740 at which time the SSTROBE* signal is activated. The P-bus interface controller 203 remains in the SSTB state 740 for one clock cycle and then makes a transition 844 to the WAIT2 state 734 to wait until GSTART* becomes inactive or BADS* becomes active, as described above.

Thus, from this detailed description, taken in conjunction with the appended drawings, the advantages of the present invention will be readily understood by one who is skilled in the relevant technology. In the previous microcomputers having synchronous buses, whenever an increase in speed was achieved for processors and memories, a unique interface circuit for a motherboard had to be designed to transfer data over a synchronous bus and its peripherals clocked at a different clock speed. The present asynchronous bus interface circuit invention allows a standardized synchronous bus to be clocked at one speed on a motherboard connected to standard bus peripherals, while processors and memory clocked at various speeds are connected to the same motherboard across an asynchronous bus. Thereby, a tremendous advantage of economies of scale can be realized from a streamlined product line not dependent on unique interface designs for every technological advance in the processor and memory technologies.

While the above detailed description has shown, described and pointed out the fundamental novel features of the invention as applied to various embodiments, it will be understood that various omissions and substitutions and changes in the form and details of the illustrated device may be made by those skilled in the art, without departing from the spirit of the invention.

We claim:

1. A microcomputer system which includes a microprocesor and a standard synchronous peripheral bus, said microprocessor having an interface specification functionally equivalent to the interface specification of one of an Intel 80286, 80386 or 80486 microprocessor, said standard synchronous peripheral bus providing electrical communication to a plurality of peripheral devices, wherein said microprocessor system comprises:

a motherboard onto which said standard synchronous peripheral PC bus is mounted, said motherboard including a plurality of circuits in electrical communication with said standard synchronous peripheral bus, said plurality of circuits and said standard synchronous peripheral PC bus on said motherboard operating in synchronism with a first clock having a first frequency;

a processor circuit board separate from said motherboard onto which said microprocessor is mounted, said processor circuit board including a connector for providing electrical communication to said motherboard, said processor circuit board including a plurality of circuits which provide functional support for said microprocessor, said microprocessor and said plurality of circuits on said processor circuit board operating in synchronism with a second clock having a second frequency, said second clock operating asynchronously with respect to said first clock;

an asynchronous bus;

a first bus interface circuit mounted on said motherboard, said first bus interface circuit providing electrical communication between said standard synchronous peripheral PC bus and said asynchronous bus;

a second bus interface circuit mounted on said processor circuit board, said second bus interface circuit providing electrical communication between said microprocessor and said asynchronous bus; and a processor memory circuit mounted on said processor circuit board and operating at said second frequency in synchronism with said microprocessor.

2. The microcomputer system as defined in claim 1, further comprising:

a memory circuit board which includes a memory circuit, said memory circuit operating in synchronism with a third clock having a third frequency; and a third bus interface circuit mounted on said memory circuit board, said third bus interface circuit providing electrical communication between said memory circuit and said asynchronous bus.

\* \* \* \* \*